(12) United States Patent
Zhang et al.

(10) Patent No.: US 11,831,884 B2
(45) Date of Patent: *Nov. 28, 2023

(54) INTERACTION BETWEEN IBC AND BIO

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/529,607

(22) Filed: Nov. 18, 2021

(65) Prior Publication Data
US 2022/0078452 A1 Mar. 10, 2022

Related U.S. Application Data

(63) Continuation of application No. 17/011,157, filed on Sep. 3, 2020, now Pat. No. 11,202,081, which is a
(Continued)

(30) Foreign Application Priority Data

Jun. 5, 2018 (WO) ................ PCT/CN2018/089920

(51) Int. Cl.
*H04N 19/176* (2014.01)
*H04N 19/107* (2014.01)
(Continued)

(52) U.S. Cl.
CPC ......... *H04N 19/176* (2014.11); *H04N 19/105* (2014.11); *H04N 19/107* (2014.11);
(Continued)

(58) Field of Classification Search
CPC .. H04N 19/105; H04N 19/119; H04N 19/176; H04N 19/117; H04N 19/132; H04N 19/159
See application file for complete search history.

(56) References Cited

U.S. PATENT DOCUMENTS 7,529,302 B2 5/2009 Mukerjee et al.
8,184,715 B1 5/2012 Rosenzweig et al.
(Continued)

FOREIGN PATENT DOCUMENTS

CA 3025490 A1 12/2017
CA 3037685 A1 3/2018
(Continued)

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting, Torino, IT, Jul. 13-21, 2017, document JVET-G1001, 2017.
(Continued)

*Primary Examiner* — Nasim N Nirjhar
(74) *Attorney, Agent, or Firm* — Perkins Coie LLP

(57) ABSTRACT

Devices, systems and methods for applying intra-block copy (IBC) in video coding are described. In general, methods for integrating IBC with existing motion compensation algorithms for video encoding and decoding are described. In a representative aspect, a method for video encoding using IBC includes determining whether a current block of the current picture is to be encoded using a motion compensation algorithm, and encoding, based on the determining, the
(Continued)

current block by selectively applying an intra-block copy to the current block. In a representative aspect, another method for video encoding using IBC includes determining whether a current block of the current picture is to be encoded using an intra-block copy, and encoding, based on the determining, the current block by selectively applying a motion compensation algorithm to the current block.

20 Claims, 14 Drawing Sheets

Related U.S. Application Data continuation of application No. PCT/IB2019/054614, filed on Jun. 4, 2019.

(51) Int. Cl.
| | |
|---|---|
| H04N 19/583 | (2014.01) |
| H04N 19/132 | (2014.01) |
| H04N 19/139 | (2014.01) |
| H04N 19/159 | (2014.01) |
| H04N 19/167 | (2014.01) |
| H04N 19/105 | (2014.01) |
| H04N 19/117 | (2014.01) |
| H04N 19/119 | (2014.01) |

(52) U.S. Cl.
CPC ......... *H04N 19/117* (2014.11); *H04N 19/119* (2014.11); *H04N 19/132* (2014.11); *H04N 19/139* (2014.11); *H04N 19/159* (2014.11); *H04N 19/167* (2014.11); *H04N 19/583* (2014.11)

(56) References Cited

U.S. PATENT DOCUMENTS

| | | | |
|---|---|---|---|
| 8,462,846 B2 | 6/2013 | Zhang | |
| 9,294,777 B2 | 3/2016 | Wang | |
| 9,374,595 B2 | 6/2016 | Kim et al. | |
| 9,432,684 B2 | 8/2016 | Lee et al. | |
| 9,521,425 B2 | 12/2016 | Chen et al. | |
| 9,615,089 B2 | 4/2017 | Fartukov et al. | |
| 9,667,996 B2 | 5/2017 | Chen et al. | |
| 9,674,542 B2 | 6/2017 | Chen et al. | |
| 9,762,927 B2 | 9/2017 | Chen et al. | |
| 9,900,593 B2 | 2/2018 | Xiu et al. | |
| 9,948,930 B2 | 4/2018 | Panusopone et al. | |
| 9,955,186 B2 | 4/2018 | Chon et al. | |
| 10,045,014 B2 | 8/2018 | Zhang et al. | |
| 10,142,655 B2 | 11/2018 | Lin et al. | |
| 10,298,950 B2 | 5/2019 | Wang et al. | |
| 10,362,330 B1 | 7/2019 | Li et al. | |
| 10,404,990 B2 | 9/2019 | Hendry et al. | |
| 10,419,763 B2 | 9/2019 | Huang et al. | |
| 10,440,378 B1 | 10/2019 | Xu et al. | |
| 10,448,010 B2 | 10/2019 | Chen et al. | |
| 10,484,686 B2 | 11/2019 | Xiu et al. | |
| 10,491,902 B1 | 11/2019 | Xu et al. | |
| 10,523,964 B2 | 12/2019 | Chuang et al. | |
| 10,560,712 B2 | 2/2020 | Zou et al. | |
| 10,701,366 B2 | 6/2020 | Chen et al. | |
| 10,708,592 B2 | 7/2020 | Dong et al. | |
| 10,757,417 B2 | 8/2020 | Zhang et al. | |
| 10,778,999 B2 | 9/2020 | Li et al. | |
| 10,779,002 B2 | 9/2020 | Chen et al. | |
| 10,785,494 B2 | 9/2020 | Chien et al. | |
| 10,805,630 B2 | 10/2020 | Li et al. | |
| 10,841,609 B1 | 11/2020 | Liu et al. | |
| 10,904,565 B2 | 1/2021 | Chuang et al. | |
| 11,172,196 B2 | 11/2021 | Zhang et al. | |
| 11,197,003 B2 | 12/2021 | Zhang et al. | |
| 11,197,007 B2 | 12/2021 | Zhang et al. | |
| 11,202,065 B2 | 12/2021 | Zhang et al. | |
| 11,202,081 B2 | 12/2021 | Zhang et al. | |
| 11,477,463 B2 | 10/2022 | Zhang et al. | |
| 11,509,915 B2 | 11/2022 | Zhang et al. | |
| 11,523,123 B2 | 12/2022 | Zhang et al. | |
| 11,616,945 B2 | 3/2023 | Zhang et al. | |
| 2007/0192762 A1 | 8/2007 | Eichenberger et al. | |
| 2011/0002386 A1 | 1/2011 | Zhang | |
| 2011/0194609 A1 | 8/2011 | Rusert et al. | |
| 2011/0200107 A1 | 8/2011 | Ryu | |
| 2012/0219216 A1 | 8/2012 | Sato | |
| 2012/0287999 A1 | 11/2012 | Li et al. | |
| 2012/0320984 A1 | 12/2012 | Zhou et al. | |
| 2013/0003842 A1* | 1/2013 | Kondo | H04N 19/105 375/E7.243 |
| 2013/0101041 A1 | 4/2013 | Fishwick et al. | |
| 2013/0107958 A1 | 5/2013 | Shimada et al. | |
| 2013/0128976 A1 | 5/2013 | Koyama et al. | |
| 2013/0182755 A1 | 7/2013 | Chen et al. | |
| 2013/0229485 A1 | 9/2013 | Rusanovskyy et al. | |
| 2013/0272410 A1 | 10/2013 | Seregin et al. | |
| 2013/0329007 A1 | 12/2013 | Zhang et al. | |
| 2014/0086325 A1 | 3/2014 | Chen et al. | |
| 2014/0286408 A1 | 9/2014 | Zhang et al. | |
| 2014/0286416 A1 | 9/2014 | Jeon et al. | |
| 2014/0294066 A1 | 10/2014 | Kondo | |
| 2014/0294078 A1 | 10/2014 | Seregin et al. | |
| 2014/0334551 A1 | 11/2014 | Kim et al. | |
| 2015/0023423 A1 | 1/2015 | Zhang et al. | |
| 2015/0181216 A1 | 6/2015 | Zhang et al. | |
| 2015/0249828 A1 | 9/2015 | Rosewarne et al. | |
| 2015/0312588 A1 | 10/2015 | Yamamoto et al. | |
| 2015/0373350 A1 | 12/2015 | Hendry et al. | |
| 2015/0373357 A1 | 12/2015 | Pang et al. | |
| 2015/0373362 A1 | 12/2015 | Pang et al. | |
| 2016/0057420 A1 | 2/2016 | Pang et al. | |
| 2016/0073132 A1 | 3/2016 | Zhang et al. | |
| 2016/0100189 A1 | 4/2016 | Pang et al. | |
| 2016/0142729 A1 | 5/2016 | Wang et al. | |
| 2016/0286229 A1 | 9/2016 | Li et al. | |
| 2016/0366441 A1 | 12/2016 | An et al. | |
| 2016/0373756 A1 | 12/2016 | Yu et al. | |
| 2017/0054996 A1 | 2/2017 | Xu et al. | |
| 2017/0085905 A1 | 3/2017 | Kadono et al. | |
| 2017/0142418 A1 | 5/2017 | Li et al. | |
| 2017/0223378 A1 | 8/2017 | Tao et al. | |
| 2017/0238005 A1 | 8/2017 | Chien et al. | |
| 2017/0238011 A1 | 8/2017 | Pettersson et al. | |
| 2017/0272748 A1 | 9/2017 | Seregin et al. | |
| 2017/0272782 A1 | 9/2017 | Li et al. | |
| 2017/0289566 A1 | 10/2017 | He et al. | |
| 2017/0310990 A1 | 10/2017 | Hsu | |
| 2017/0332095 A1 | 11/2017 | Zou et al. | |
| 2017/0332099 A1 | 11/2017 | Lee et al. | |
| 2017/0339404 A1 | 11/2017 | Panusopone et al. | |
| 2017/0339405 A1 | 11/2017 | Wang et al. | |
| 2018/0041762 A1 | 2/2018 | Ikai et al. | |
| 2018/0048889 A1 | 2/2018 | Zhang et al. | |
| 2018/0054628 A1 | 2/2018 | Pettersson et al. | |
| 2018/0063553 A1 | 3/2018 | Zhang et al. | |
| 2018/0098062 A1 | 4/2018 | Li et al. | |
| 2018/0098087 A1 | 4/2018 | Li et al. | |
| 2018/0124394 A1 | 5/2018 | Xu et al. | |
| 2018/0131952 A1 | 5/2018 | Xiu et al. | |
| 2018/0184117 A1 | 6/2018 | Chen et al. | |
| 2018/0192069 A1 | 7/2018 | Chen et al. | |
| 2018/0192072 A1* | 7/2018 | Chen | H04N 19/139 |
| 2018/0199056 A1 | 7/2018 | Sato | |
| 2018/0220149 A1 | 8/2018 | Son et al. | |
| 2018/0247396 A1 | 8/2018 | Pouli et al. | |
| 2018/0249172 A1* | 8/2018 | Chen | H04N 19/521 |
| 2018/0270500 A1 | 9/2018 | Li et al. | |
| 2018/0278951 A1 | 9/2018 | Seregin et al. | |
| 2018/0288425 A1 | 10/2018 | Panusopone et al. | |
| 2018/0288441 A1 | 10/2018 | Zhang et al. | |
| 2018/0324454 A1 | 11/2018 | Lin et al. | |
| 2018/0332298 A1 | 11/2018 | Liu et al. | |
| 2018/0376166 A1 | 12/2018 | Chuang et al. | |
| 2019/0020895 A1 | 1/2019 | Liu et al. | |

(56) References Cited

U.S. PATENT DOCUMENTS

| | | |
|---|---|---|
| 2019/0037231 A1 | 1/2019 | Ikai et al. |
| 2019/0052886 A1 | 2/2019 | Chiang et al. |
| 2019/0058897 A1 | 2/2019 | Han et al. |
| 2019/0068977 A1 | 2/2019 | Zhang et al. |
| 2019/0075293 A1 | 3/2019 | Lim et al. |
| 2019/0104303 A1 | 4/2019 | Xiu et al. |
| 2019/0124332 A1 | 4/2019 | Lim et al. |
| 2019/0158866 A1 | 5/2019 | Kim |
| 2019/0182504 A1 | 6/2019 | Lainema |
| 2019/0191171 A1 | 6/2019 | Ikai et al. |
| 2019/0222859 A1 | 7/2019 | Chuang et al. |
| 2019/0246128 A1 | 8/2019 | Xu et al. |
| 2019/0246143 A1* | 8/2019 | Zhang ............... H04N 19/132 |
| 2019/0273943 A1 | 9/2019 | Zhao et al. |
| 2019/0306502 A1 | 10/2019 | Gadde et al. |
| 2019/0320181 A1 | 10/2019 | Chen et al. |
| 2019/0320189 A1 | 10/2019 | Cooper et al. |
| 2019/0335170 A1 | 10/2019 | Lee et al. |
| 2019/0342547 A1 | 11/2019 | Lee et al. |
| 2019/0364295 A1 | 11/2019 | Li et al. |
| 2019/0373259 A1* | 12/2019 | Xu ....................... H04N 19/176 |
| 2019/0373261 A1 | 12/2019 | Eglimez et al. |
| 2019/0387250 A1 | 12/2019 | Boyce et al. |
| 2020/0021837 A1 | 1/2020 | Ikai et al. |
| 2020/0021839 A1 | 1/2020 | Pham Van et al. |
| 2020/0045310 A1 | 2/2020 | Chen et al. |
| 2020/0045311 A1 | 2/2020 | Yoo |
| 2020/0053364 A1 | 2/2020 | Seo |
| 2020/0059658 A1 | 2/2020 | Chien et al. |
| 2020/0084441 A1 | 3/2020 | Lee et al. |
| 2020/0084454 A1 | 3/2020 | Liu et al. |
| 2020/0099951 A1 | 3/2020 | Hung et al. |
| 2020/0112741 A1 | 4/2020 | Han et al. |
| 2020/0120334 A1 | 4/2020 | Xu et al. |
| 2020/0128237 A1 | 4/2020 | Xu et al. |
| 2020/0128258 A1 | 4/2020 | Chen et al. |
| 2020/0137398 A1 | 4/2020 | Zhao et al. |
| 2020/0145688 A1 | 5/2020 | Zou et al. |
| 2020/0154127 A1 | 5/2020 | Lee |
| 2020/0169726 A1 | 5/2020 | Kim et al. |
| 2020/0177911 A1 | 6/2020 | Aono et al. |
| 2020/0213594 A1 | 7/2020 | Liu et al. |
| 2020/0213612 A1 | 7/2020 | Liu et al. |
| 2020/0213622 A1 | 7/2020 | Xu et al. |
| 2020/0221077 A1 | 7/2020 | Park et al. |
| 2020/0221110 A1 | 7/2020 | Chien et al. |
| 2020/0221120 A1 | 7/2020 | Robert et al. |
| 2020/0267408 A1 | 8/2020 | Lee et al. |
| 2020/0275120 A1 | 8/2020 | Lin et al. |
| 2020/0296380 A1 | 9/2020 | Aono et al. |
| 2020/0296382 A1 | 9/2020 | Zhao et al. |
| 2020/0296415 A1 | 9/2020 | Chen et al. |
| 2020/0336738 A1 | 10/2020 | Xiu et al. |
| 2020/0351505 A1 | 11/2020 | Seo |
| 2020/0359029 A1 | 11/2020 | Liu et al. |
| 2020/0374543 A1 | 11/2020 | Liu et al. |
| 2020/0374544 A1 | 11/2020 | Liu et al. |
| 2020/0382771 A1 | 12/2020 | Liu et al. |
| 2020/0382795 A1 | 12/2020 | Zhang et al. |
| 2020/0382807 A1 | 12/2020 | Liu et al. |
| 2020/0396453 A1 | 12/2020 | Zhang et al. |
| 2020/0396462 A1 | 12/2020 | Zhang et al. |
| 2020/0396465 A1 | 12/2020 | Zhang et al. |
| 2020/0404255 A1 | 12/2020 | Zhang et al. |
| 2020/0404260 A1 | 12/2020 | Zhang et al. |
| 2020/0413048 A1 | 12/2020 | Zhang et al. |
| 2021/0006780 A1 | 1/2021 | Zhang et al. |
| 2021/0006787 A1 | 1/2021 | Zhang et al. |
| 2021/0029356 A1 | 1/2021 | Zhang et al. |
| 2021/0029362 A1 | 1/2021 | Liu et al. |
| 2021/0029368 A1 | 1/2021 | Zhang et al. |
| 2021/0037240 A1 | 2/2021 | Zhang et al. |
| 2021/0037256 A1 | 2/2021 | Zhang et al. |
| 2021/0051339 A1 | 2/2021 | Liu et al. |
| 2021/0067783 A1 | 3/2021 | Liu et al. |
| 2021/0076050 A1 | 3/2021 | Zhang et al. |
| 2021/0076063 A1 | 3/2021 | Liu et al. |
| 2021/0092379 A1 | 3/2021 | Zhang et al. |
| 2021/0092435 A1 | 3/2021 | Liu et al. |
| 2021/0105482 A1 | 4/2021 | Zhang et al. |
| 2021/0152846 A1 | 5/2021 | Zhang et al. |
| 2021/0203958 A1 | 7/2021 | Zhang et al. |
| 2021/0218980 A1 | 7/2021 | Zhang et al. |
| 2021/0227234 A1 | 7/2021 | Zhang et al. |
| 2021/0352302 A1 | 11/2021 | Zhang et al. |
| 2021/0392341 A1 | 12/2021 | Zhang et al. |
| 2022/0070488 A1 | 3/2022 | Chen et al. |
| 2022/0070489 A1 | 3/2022 | Zhang et al. |
| 2022/0217363 A1 | 7/2022 | Zhang et al. |
| 2022/0264125 A1 | 8/2022 | Zhang et al. |

FOREIGN PATENT DOCUMENTS

| | | |
|---|---|---|
| CN | 1672174 A | 9/2005 |
| CN | 1710959 A | 12/2005 |
| CN | 1777283 A | 5/2006 |
| CN | 101605255 A | 12/2009 |
| CN | 101895751 A | 11/2010 |
| CN | 102577388 A | 7/2012 |
| CN | 103561263 A | 2/2014 |
| CN | 104053005 A | 9/2014 |
| CN | 104170381 A | 11/2014 |
| CN | 104221376 A | 12/2014 |
| CN | 107979756 A | 5/2015 |
| CN | 104904207 A | 9/2015 |
| CN | 105306944 A | 2/2016 |
| CN | 105532000 A | 4/2016 |
| CN | 105678808 A | 6/2016 |
| CN | 105723713 A | 6/2016 |
| CN | 105917650 A | 8/2016 |
| CN | 106303543 A | 1/2017 |
| CN | 106416245 A | 2/2017 |
| CN | 106537915 A | 3/2017 |
| CN | 106559669 A | 4/2017 |
| CN | 106688232 A | 5/2017 |
| CN | 107079161 A | 8/2017 |
| CN | 107113424 A1 | 8/2017 |
| CN | 107113442 A | 8/2017 |
| CN | 107211156 A | 9/2017 |
| CN | 107409225 A | 11/2017 |
| CN | 107426568 A | 12/2017 |
| CN | 107534778 A | 1/2018 |
| CN | 107615765 A | 1/2018 |
| CN | 107852490 A | 3/2018 |
| CN | 107925775 A | 4/2018 |
| CN | 108012153 A | 5/2018 |
| CN | 108028929 A | 5/2018 |
| CN | 108432250 A | 8/2018 |
| CN | 108632629 A | 10/2018 |
| CN | 112020829 A | 12/2020 |
| EP | 3788782 A1 | 3/2021 |
| GB | 2539213 A | 12/2016 |
| JP | H08186825 A | 7/1996 |
| JP | 2007272733 A | 10/2007 |
| JP | 2011077761 A | 4/2011 |
| JP | 2013098745 A | 5/2013 |
| JP | 2021513818 A | 5/2021 |
| KR | 20200128154 A | 11/2020 |
| TW | 201540047 A | 10/2015 |
| TW | 201709738 A | 3/2017 |
| TW | 201832557 A | 9/2018 |
| WO | 2000065829 A1 | 11/2000 |
| WO | 2009080133 A1 | 7/2009 |
| WO | 2013168407 A1 | 11/2013 |
| WO | 2016048834 A1 | 3/2016 |
| WO | 2016057701 A1 | 4/2016 |
| WO | 2016091161 A1 | 6/2016 |
| WO | 2016138513 A1 | 9/2016 |
| WO | 2016183224 A1 | 11/2016 |
| WO | 2017130696 A1 | 3/2017 |
| WO | 2017118411 A1 | 7/2017 |
| WO | 2017133661 A1 | 8/2017 |
| WO | 2017157264 A1 | 9/2017 |
| WO | 2017157281 A1 | 9/2017 |

(56) References Cited

FOREIGN PATENT DOCUMENTS

| WO | 2017165391 A1 | 9/2017 |
|---|---|---|
| WO | 2017188509 A1 | 11/2017 |
| WO | 2017195554 A1 | 11/2017 |
| WO | 2017197126 A1 | 11/2017 |
| WO | 2017197146 A1 | 11/2017 |
| WO | 2017206803 A1 | 12/2017 |
| WO | 2018047668 A1 | 3/2018 |
| WO | 2018066241 A1 | 4/2018 |
| WO | 2018067823 A1 | 4/2018 |
| WO | 2018097692 A2 | 5/2018 |
| WO | 2018097693 A1 | 7/2018 |
| WO | 2018184589 A1 | 10/2018 |
| WO | 2020086331 A1 | 4/2020 |

OTHER PUBLICATIONS

Chen et al. "Description of SDR, HDR and 360 degree Video Coding Technology Proposal by Qualcomm and Technicolor—low and high complexity versions," Joint Video Exploration Team (JVET) of ITU-T SG 16 WP 3 and ISO/IEC JTC 1/SC 29/WG 11, 10th Meeting, San Diego, US, Apr. 10-20, 2018, document JVET-J0021, 2018.

Chen et al. "DMVR Extension baed on Template Matching," Joint Video Exploration Team (JVET) of ITU-T SG 16 WP 3 and ISO/IEC JTC 1/SC 29/WG 11, 10th Meeting, San Diego, US, Apr. 10-20, 2018, document JVET-J0057, 2018.

Chien et al. "Modification of Merge Candidate Derivation," Joint Video Exploration Team (JVET) of ITU-T SG 16 WP 3 and ISO/IEC JTC 1/SC 29/WG 11, 2nd Meeting, San Diego, USA, Feb. 20-26, 2016, document JVET-B0058, 2016.

He et al. "Non-SCCE1: Improved Intra Block Copy Coding with Block Vector Derivation," Joint Collaborative Team on Video Coding (JCT-VC) of ITU-T SG 16 WP 3 and ISO/IEC JTC 1/SC 29/WG 11, 18th Meeting, Sapporo, JP, Jun. 30-Jul. 9, 2017, document JCTVC-R0165, 2014.

Hsu et al. "Description of SDR Video Coding Technology Proposal by Mediatek," Joint Video Experts Team (JVET) of ITU-T SG 16 WP 3 and ISO/IEC JTC 1/SC 29/WG 11, 10th Meeting, San Diego, US, Apr. 10-20, 2018, document JVET-J0018, 2018.

Li et al. "Adaptive Motion Vector Resolution for Screen Content," Joint Collaborative Team on Video Coding (JCT-VC) of ITU-T SG 16 WP 3 and ISO/IEC JTC 1/SC 29/WG 11, 19th Meeting, Strasbourg, FR, Oct. 17-24, 2014, document JCTVC-S0085, 2014.

Toma et al. "Description of SDR Video Coding Technology Proposal by Panasonic," Joint Video Experts Team (JVET) of ITU-T SG 16 WP 3 and ISO/IEC JTC 1/SC 29/WG 11, 10th Meetingmm San Diego, US, Apr. 10-20, 2018, document JVET-J0020, 2018.

Xu et al. "Intra Block Copy in HEVC Screen Content Coding Extensions," IEEE Journal on Emerging and Selected Topics in Circuits and Systems, Dec. 2016, 6(4):409-419.

Zhang et al. "Rotate Intra Block Copy for Still Image Coding," 2015 IEEE International Conference on Image Processing (ICIP), IEEE, Sep. 27, 2015, pp. 4102-4106.

Zhang et al. "On Adaptive Motion Vector Resolution," Joint Collaborative Team on Video Coding (JCT-VC) of ITU-T SG 16 WP 3 and ISO/IEC JTC 1/SC 29/WG 11, 20th Meeting, Geneva, CH, Feb. 10-18, 2015, document JCTVC-T0059, 2015.

Zou et al. "Improved Affine Motion Prediction," Joint Video Exploration Team (JVET) of ITU-T SG 16 WP3 and ISO/IEC JTC 1/SC 29/WG 11, 3rd Meeting, Geneva, CH, May 26-Jun. 1, 2016, document JVET-C0062, 2016.

International Search Report and Written Opinion from PCT/IB2019/054602 dated Aug. 21, 2019 (17 pages).

International Search Report and Written Opinion from PCT/IB2019/054604 dated Sep. 26, 2019 (17 pages).

International Search Report and Written Opinion from PCT/IB2019/054611 dated Aug. 29, 2019 (88 pages).

International Search Report and Written Opinion from PCT/IB2019/054612 dated Sep. 26, 2019 (17 pages).

International Search Report and Written Opinion from PCT/IB2019/054614 dated Aug. 27, 2019 (14 pages).

International Search Report and Written Opinion from PCT/IB2019/054650 dated Oct. 28, 2019 (20 pages).

International Search Report and Written Opinion from PCT/IB2019/054652 dated Sep. 27, 2019 (18 pages).

International Search Report and Written Opinion from PCT/IB2019/054654 dated Aug. 27, 2019 (85 pages).

Sullivan et al. "Meeting Report of the 18th Meeting of the Joint Collaborative Team on Video Coding (JCT-VC), Sapporo, JP, Jun. 30-Jul. 9, 2014", Joint Collaborative Team on Video Coding (JCT-VC) of ITU-T SG16 WP3 and ISO/IEC JTC1/SC29/WG11, 18th Meeting: Sapporo, JP, Jun. 30-Jul. 9, 2014, JCTVC-R, 2014.

Non-Final Office Action from U.S. Appl. No. 17/019,629 dated Nov. 13, 2020.

Non-Final Office Action from U.S. Appl. No. 17/031,451 dated Dec. 4, 2020.

Notice of Allowance from U.S. Appl. No. 17/011,131 dated Dec. 10, 2020.

Non-Final Office Action from U.S. Appl. No. 17/005,521 dated Jan. 7, 2021.

Non-Final Office Action from U.S. Appl. No. 17/071,357 dated Sep. 21, 2021.

Advisory Action from U.S. Appl. No. 17/074,892 dated Aug. 4, 2021.

Final Office Action from U.S. Appl. No. 17/161,391 dated Jul. 14, 2021.

Non-Final Office Action from U.S. Appl. No. 17/011,157 dated Nov. 17, 2020.

Huang, Wanzhang, "Research on Side Information Generation of Distributed Video Coding," South China University of Technology, Guangzhou, China, 2012.

Jang et al. "Non-CE8: Modification on SbTMVP Process Regarding with CPR," Joint Video Experts Team (JVET) of ITU-T SG 16 WP3 and ISO/IEC JTC 1/SC 29/WG 11, 13th Meeting, Marrakech, MA, Jan. 9-18, 2019, document JVET-M0335, 2019.

Lai et al. "CE8-Related: Clarification on Interaction Between CPR and other Inter Coding Tools," Joint Video Experts Teram (JVET) of ITU-T SG 16 WP 3 and ISO/IEC JTC 1/SC 29/WG 11, 13th Meeting, Marrakech, MA, Jan. 9-18, 2019, document JVET-M0175, 2019.

Solovyev et al. "Non-CE4: Merge Mode Modification," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K0056, 2018.

Xu et al. "Non-CE8: Mismatch Between Text Specification and Reference Software on ATMVP Candidate Derivation When CPR is Enabled," Joint Video Experts Team (JVET) of ITU-T SG 16 WP 3 and ISO/IEC JTC 29/WG 11, 13th Meeting, Marrakech, MA, Jan. 9-18, 2019, document JVET-M0409, 2019.

Yang et al. "BOG Report on CE4 Related Contributions," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K0546, 2018.

Zhao et al. "Intra Mini-Block Copy Algorithm for Screen Content Coding," Journal of Computer Applications, 2016, 36(7): 1938-1943.

Zuo et al. "Intra Block Copy for Intra-Frame Coding," Joint Video Experts Team (JVET) of ITU-T SG 16 WP 3 and ISO/IEC JTC 1/SC 29/WG 11 10th Meeting: San Diego, US, Apr. 10-20, 2018, document JVET-J0042, 2018.

Bross et al. "Versatile Video Coding (Draft 3)," Joint Video Experts Team (JVET) of ITU-T SG 16 WP 3 and ISO/IEC JTC 1/SC 29/WG 11 12th Meeting: Macao, CN, Oct. 3-12, 2018. document JVET-L1001, 2018.

Zhang et al. "AHG16: Clean-up on MV Rounding," Joint Video Experts Team (JVET) of ITU-T SG 16 WP 3 and ISO/IEC JTC 1/SC 29/WG 11, 13th Meeting, Marrakech, MA Jan. 9-18, 2019, document JVET-M0265, 2019.

Extended European Search Report from European Patent Application No. 19882864.2 dated Mar. 21, 2022 (9 pages).

Non Final Office Action from U.S. Appl. No. 17/019,629 dated Jun. 8, 2022.

(56) References Cited

OTHER PUBLICATIONS

Final Office Action from U.S. Appl. No. 17/031,451 dated Dec. 21, 2021.
Notice of Allowance n from U.S. Appl. No. 17/071,357 dated Feb. 2, 2022.
Office Action from Indian Patent Application No. 202127002718 dated Jan. 6, 2022.
Bross et al. "Versatlie Video Coding (Draft 2)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K1001, 2018.
Bross et al. "Versatile Video Coding (Draft 4)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M1001, 2019.
Bross et al. "Versatile Video Coding (Draft 5)," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N1001, 2019.
Chen et al. "EE3: Generalized Bi-Prediction," Joint Video Exploration Team (JVET) of ITU-T SG 16 WP 3 and ISO/IEC JTC 1/SC 29/WG 11, 4th Meeting, Chengdu, CN, Oct. 15-21, 2016, document JVET-D0102, 2016.
JEM-7.0: https://jvet.hhi.fraunhofer.de/svn/svn_HMJEMSoftware/tags/ HM-16.6-JEM-7.0. (only website).
Han et al. "CE4-Related: Modification on Merge List," Joint Video Exploration Team (JVET) of ITU-T SG 16 WP 3 and ISO/IEC JTC 1/SC 29/WG 11, 13th Meeting, Marrakech, MA, Jan. 9-18, 2019, document JVET-M0127, 2019.
Hsiao et al. "CE4.2.8: Merge Mode Enhancement," Joint Video Experts Team (JVET of ITU-T SG 16 WP 3 and ISO/IEC JTC 1/SC 29/WG 11, 11th Meeting: Ljubljana, SI, Jul. 10-18, 2018, document JVET-K0245, 2018.
Hsiao et al. "CE4.4.12: Pairwise Average Candidates," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0090, 2019.
H.265/HEVC, https://www.itu.int/rec/T-REC-H.265.
Lee et al. "Unified Condition for Affine Merge and Affine Inter Mode," Joint Video Exploration Team (JVET) of ITU-T SG 16 WP 3 and ISO/IEC JTC 1/SC 29/WG 11, 5th Meeting, Geneva, CH, Jan. 12-20, 2017, JVET-E0039, 2017.
Liao et al. "CE10.1.b: Triangular Prediction Unit Mode," Joint Video Exploration Team (JVET) of ITU-T SG 16 WP 3 and ISO/IEC JTC 1/SC 29/WG 11, 12th Meeting, Macao, CN, Oct. 3-12, 2018, document JVET-L0124. 2018.
Li et al. "Multi-Type-Tree." Joint Video Exploration Team (JVET), of ITU-T SG 16 WP 3 and ISO/IEC JTC 1/SC 29/WG 11, 4th Meeting: Chengdu, CN, Oct. 15-21, 2016, document JVET-D0117rl, 2016.
Li et al. "Non-CE4: Harmonization between HMVP and Gbi," Joint Video Experts Team (JVET) of ITU-T SG 16 WP 3 and ISO/IEC JTC 1/SC 29/WG 11, 13th Meeting: Marrakech, MA, Jan. 9-18, 2019, document JVET-M0264, 2019.
Luthra et al. Overview of the H.264/AVC Video Coding Standard, Proc. SPIE, 5203, Applications of Digital Image Processing, Nov. 19, 2003, Optical Science and Technology, SPIE 48th annutal Meeting, San Diego, CA, US, 2003.
Su et al. "CE4.4.1: Generalized Bi-Prediction for Intercoding," Joint Video Exploration Team of ISO/IEC JTC 1/SC 29/ WG 11 and ITU-T SG 16, Ljubljana, Jul. 11-18, 2018, document No. JVET-K0248, 2018.
Sullivan et al. "Overview of the High Efficiency Video Coding (HEVC) Standard," IEEE Transactions on Circuits and Systems for Video Technology, Dec. 2012, 22(12):1649-1668.
Van Der Auwera et al. "Description of Core Experiment 3: Intra Prediction and Mode Coding," Joint Video Experts Team (JVET) of ITU-T SG 16 WP 3 and ISO/IEC JTC 1/SC 29/WG 11, 10th Meeting, San Diego, USA, Apr. 10-20, 2018. document JVET-J1023, 2018.
Xu et al. "CE8-Related Combination Test of JVET-N0176/JVET-N0317/JVET-N0382 on Simplification of IBC Vector Prediction," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0843, 2019.
Yang et al. "Description of Core Experiment 4 (CE4): Inter Prediction and Motion Vector Coding," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K1024, 2018.
Zhang et al. "CE4-Related: Simplified Affine Prediction," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0103. 2018.
Zhang et al. "CE4-related: History-based Motion Vector Prediction", Joint Video Experts Team (JVET) of ITU-T SG 16 WP 3 and ISO/IEC JTC 1/SC 29/WG 11, 11th Meeting, Ljubljana, SI, 10-18 (Jul. 2018), Document JVET-K0104, 2018.
Zhang et al. "CE4.2.14: Planar Motion Vector Prediction," Joint Video Experts Team (JVET) of ITU-T SG 16 and WP 3 and ISO/IEC JTC 1/SC 29/WG 11, 11th Meeting: Ljubljaba, SI, Jul. 10-18, 2018, document JVET-K0135, 2018.
Zhang et al. "CE4: Affine Prediction with 4×4 Sub-blocks for Chroma Components (Test 4.1.16)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0265, 2018.
Zhang et al. "CE3-Related: Modified Chroma Derived Mode," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0272, 2018.
Zhang et al. "Adaptive Motion Vector Resolution Rounding Align," Joint Video Experts Team (JVET) of ITU-T SG 16 WP 3 and ISO/IEC JTC 1/SC 2/WG 11, 12th Meeting, Macao, CN, Oct. 3-12, 2018, document JVET-L0377, 2018.
Zhang et al. "BOG Report on CE4 Related Contributions," Joint Video Experts Team (JVET) of ITU-T SG 16 WP 3 and ISO/IEC JTC 1/SC 29/WG 11, 13th Meeting: Marrakech, MA, Jan. 9-18, 2019, document JVET-M0843, 2019.
Zhou et al. "Spatial-Temporal Merge Mode (Non Subblock STMVP)," Joint Video Exploration Team (JVET) of ITU-T SG 16 WP 3 and ISO/IEC JTC 1/SC 29/WG 11, 11th Meeting: Ljubljana, SI, Jul. 10-18, 2018, document JVET-K0532, and JVET-K0161, 2018.
International Search Report and Written Opinion from PCT/CN2019/117116 dated Jan. 2, 2020 (9 pages).
International Search Report and Written Opinion from PCT/CN2019/117118 dated Feb. 5, 2020 (9 pages).
International Search Report and Written Opinion from PCT/CN2019/117119 dated Jan. 23, 2020 (9 pages).
International Search Report and Written Opinion from PCT/IB2019/055244 dated Nov. 18, 2019 (18 pages).
International Search Report and Written Opinion from PCT/IB2019/055246 dated Nov. 7, 2019 (18 pages).
International Search Report and Written Opinion from PCT/IB2019/055247 dated Nov. 7, 2019 (21 pages).
International Search Report and Written Opinion from PCT/IB2019/058078 dated Mar. 3, 2020(20 pages).
International Search Report and Written Opinion from PCT/IB2019/058079 dated Mar. 3, 2020(26 pages).
International Search Report and Written Opinion from PCT/IB2019/058081 dated Mar. 25, 2020(21 pages).
Non-Final Office Action from U.S. Appl. No. 17/071,357 dated Dec. 8, 2020.
Non-Final Office Action from U.S. Appl. No. 17/074,842 dated Dec. 23, 2020.
Non-Final Office Action from U.S. Appl. No. 17/074,892 dated Dec. 24, 2020.
Non-Final Office Action from U.S. Appl. No. 17/099,042 dated Dec. 31, 2020.
Notice of Allowance from U.S. Appl. No. 17/071,412 dated Jan. 7, 2021.
Non-Final Office Action from U.S. Appl. No. 17/161,391 dated Mar. 25, 2021.

(56) References Cited

OTHER PUBLICATIONS

Chen et al. "Description of SDR, HDR and 360 degree Video Coding Technology Proposal by Huawei, GoPro, HiSilicon, and Samsung," Joint Video Exploration Team (JVET) of ITU-T SG 16 WP 3 and ISO/IEC JTC 1/SC 29/WG 11, 10th Meeting, San Diego, US, 10-20, Apr. 2018, document JVET-J0025, 2018.

"High Efficiency Video Coding" Series H: Audiovisual and Multimedia Systems: Infrastructure of Audiovisual Services—Coding of Moving Video, ITU-T, H.265, 2018.

Li et al. "Affine Deformation Model Based Intra Block Copy for Intra Frame Coding," 2020, Institute of Information and Communication Engineering, Zhejiang University.

Alshin et al. "Bi-Directional Optical Flow for Improving Motion Compensation," 28th Picture Coding Symposium, PCS2010, Dec. 8, 2010, Nagoya, Japan, pp. 422-425.

Li et al. "Combining Directional Intra Prediction and Intra Block Copy with Block Partitioning for HEVC," 2016 IEEE International Conference on Image Processing (ICIP), Phoenix, AZ, USA, 2016, pp. 524-528.

Final Office Action from U.S. Appl. No. 17/019,629 dated Feb. 26, 2021.

Final Office Action from U.S. Appl. No. 17/005,521 dated Apr. 26, 2021.

Intention to Grant from British Patent Application No. 2018867.8 dated Nov. 11, 2022 (2 pages).

Examination Report from Indian Patent Application No. 202228045435 dated Dec. 26, 2022.

Non Final Office Action from U.S. Appl. No. 17/525,745 dated Nov. 10, 2022.

Han et al. "A Dynamic Motion Vector Referencing Scheme for Video Coding," 2016 IEEE International Conference on Image Processing (ICIP), 2016, pp. 2032-2036.

Koyama et al. "Modification of Derivation Process of Motion Vector Information for Interlace Format," Joint Collaborative Team on Video Coding (JCT-VC) of ITU-T SG16 WP3 and ISO/IEC JTC1/SC29/WG11 7th Meeting: Geneva, CH, Nov. 21-30, 2011, document JCTVC-G196, 2011.

Shimada et al. "Non-CE9/Non-CE13: Averaged Merge Candidate," Joint Collaborative Team on Video Coding (JCT-VC)of ITU-T SG16 WP3 and ISO/IEC JTC1/SC29/WG11 7th Meeting: Geneva, CH, Nov. 21-30, 2011, document JCTVC-G195, 2011.

Non Final Office Action from U.S. Appl. No. 17/210,797 dated Aug. 2, 2022.

Non Final Office Action from U.S. Appl. No. 17/412,771 dated Feb. 16, 2023.

Non Final Office Action from U.S. Appl. No. 17/732,849 dated Mar. 2, 2023.

* cited by examiner

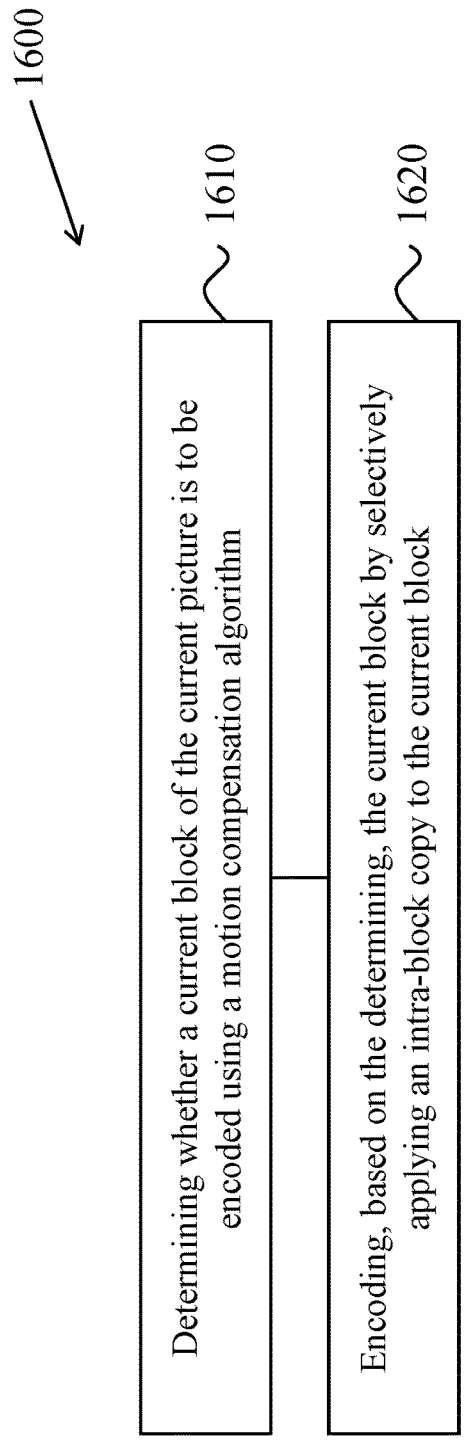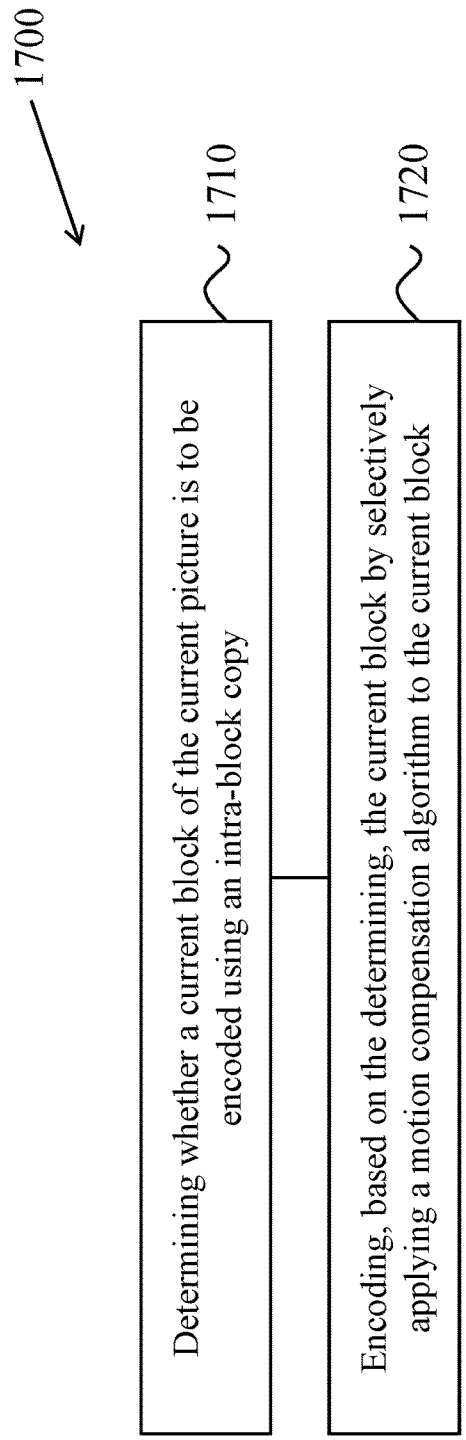
FIG. 10
FIG. 11

INTERACTION BETWEEN IBC AND BIO

PRIORITY CLAIM

This application is a continuation of U.S. application Ser. No. 17/011,157, filed on Sep. 3, 2020, which is based on International Application No. PCT/IB2019/054614, filed on Jun. 4, 2019, which claims the priority to and benefits of International Patent Application No. PCT/CN2018/089920, filed on Jun. 5, 2018. All the patent application is hereby incorporated by reference in their entireties.

TECHNICAL FIELD

This patent document is directed generally to video coding technologies.

BACKGROUND

Motion compensation is a technique in video processing to predict a frame in a video, given the previous and/or future frames by accounting for motion of the camera and/or objects in the video. Motion compensation can be used in the encoding and decoding of video data for video compression.

SUMMARY

Devices, systems and methods related to intra-block copy for motion compensation are described.

In one representative aspect, the disclosed technology may be used to provide a method for video encoding using intra-block copy. This method includes determining whether a current block of the current picture is to be encoded using a motion compensation algorithm, and encoding, based on the determining, the current block by selectively applying an intra-block copy to the current block.

In another representative aspect, the disclosed technology may be used to provide another method for video encoding using intra-block copy. This method includes determining whether a current block of the current picture is to be encoded using an intra-block copy, and encoding, based on the determining, the current block by selectively applying a motion compensation algorithm to the current block.

In yet another representative aspect, the disclosed technology may be used to provide a method for video decoding using intra-block copy. This method includes determining whether a current block of the current picture is to be decoded using a motion compensation algorithm, and decoding, based on the determining, the current block by selectively applying an intra-block copy to the current block.

In yet another representative aspect, the disclosed technology may be used to provide another method for video decoding using intra-block copy. This method includes determining whether a current block of the current picture is to be decoded using an intra-block copy, and decoding, based on the determining, the current block by selectively applying a motion compensation algorithm to the current block.

In another example aspect, a method of decoding an encoded representation of visual information is disclosed. The method includes determining that a first encoded block being decoded representing a portion of the visual information is coded using a first coding technique; and decoding the coded representation by using a first decoding technique corresponding to the first coding technique and by excluding use of a second decoding technique corresponding to the second coding technique; wherein one of the two decoding techniques corresponds to a coding technique that uses a same video picture for coding the block being decoded as a reference picture, and the other of the two decoding techniques corresponds to Bi-directional Optical Flow (BIO) technique that refines the prediction samples using optical flow information with the visual information for coding the block being decoded.

In another example aspect, a method of generating encoded representation of visual information is disclosed. The method includes obtaining a first block to encode representing a portion of the visual information; and encoding the first block to encode by using a first encoding technique and by excluding use of a second encoding technique; wherein one of two encoding technique uses a same video picture for coding the block to encode as a reference picture and the other encoding technique corresponds to Bi-directional Optical Flow (BIO) technique that refines the prediction samples using optical flow information with the visual information for encoding the block to encode.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

4 shows an example of motion vector prediction (MVP) for the AF_INTER affine motion mode.

Figure 5:
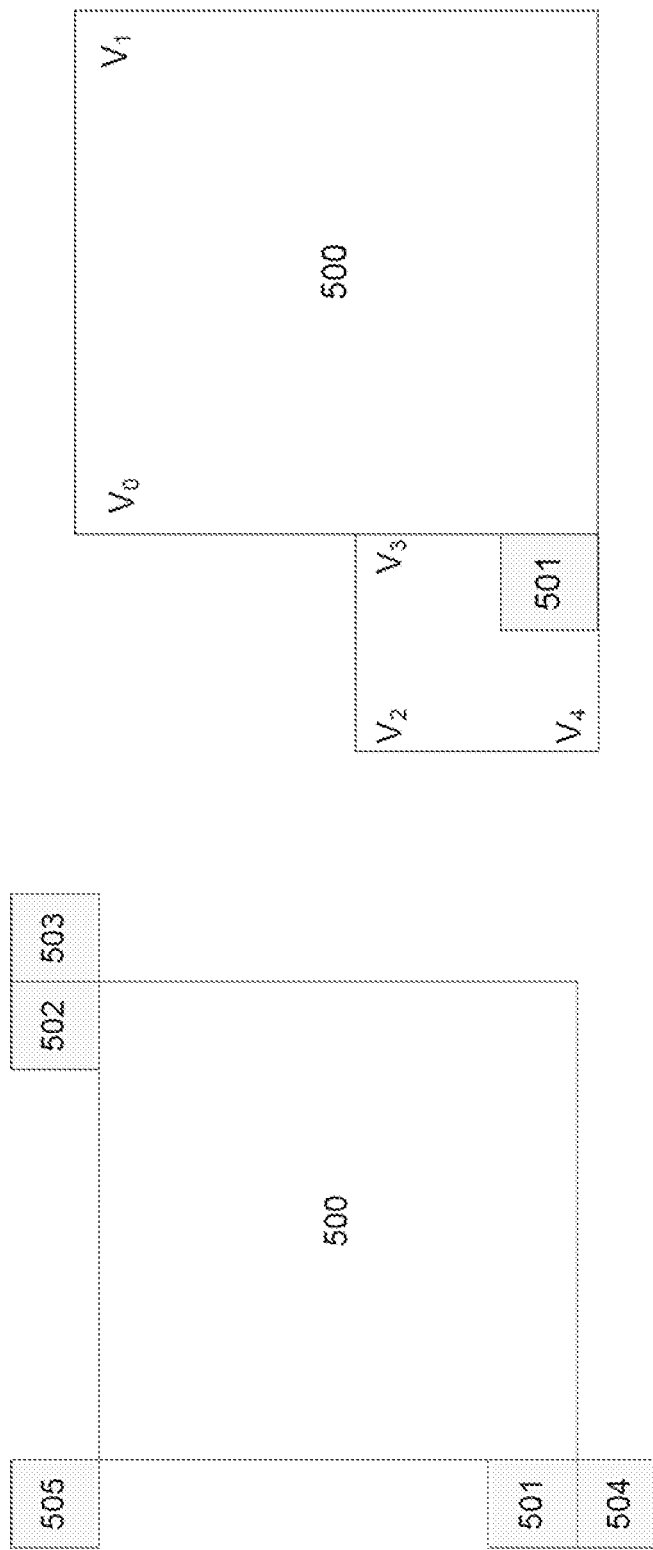

FIGS. 5A and 5B show example candidates for the AF_MERGE affine motion mode.

Figure 6:
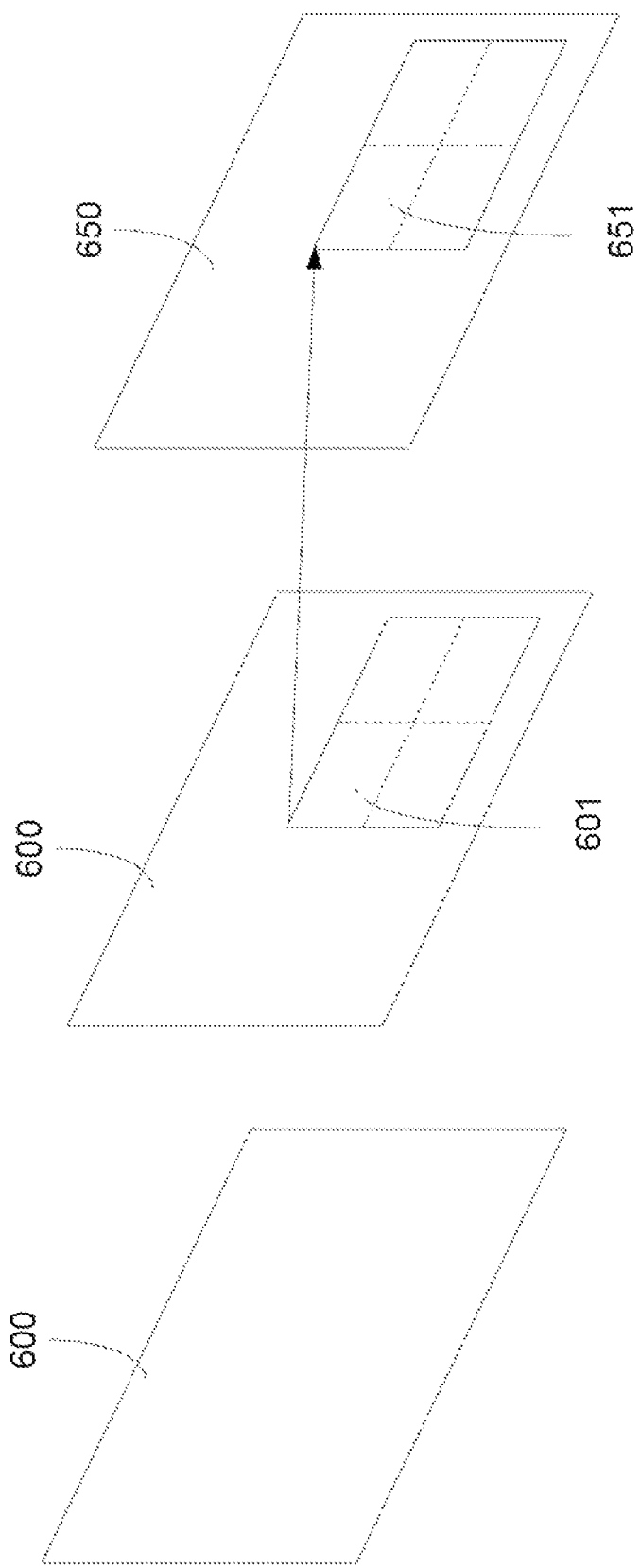

FIG. 6 shows an example of motion prediction using the alternative temporal motion vector prediction (ATMVP) algorithm for a coding unit (CU).

Figure 7:
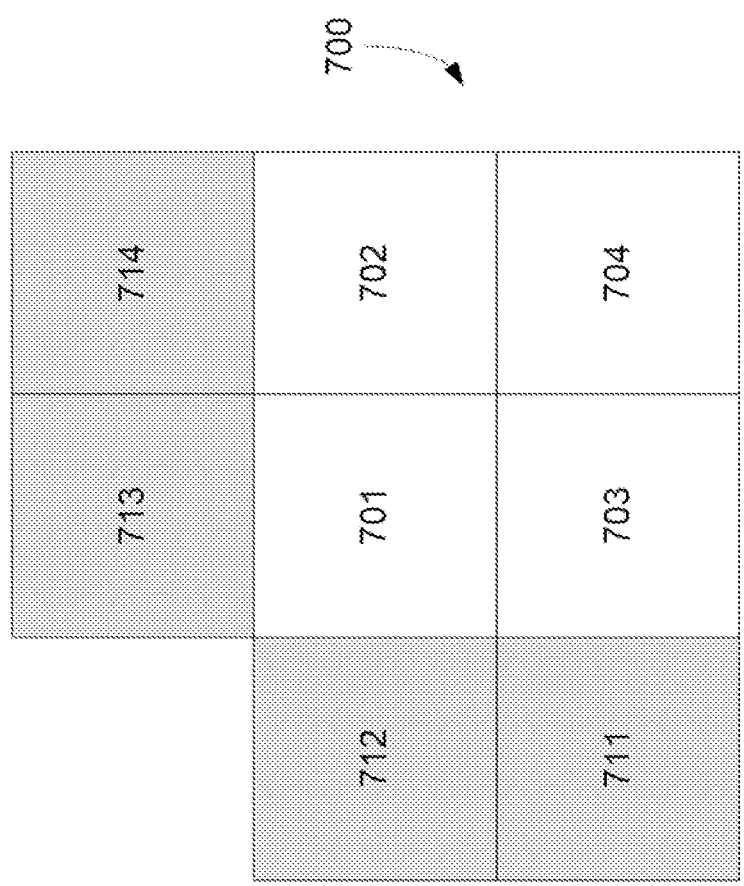

FIG. 7 shows an example of a coding unit (CU) with sub-blocks and neighboring blocks used by the spatial-temporal motion vector prediction (STMVP) algorithm.

Figure 8:
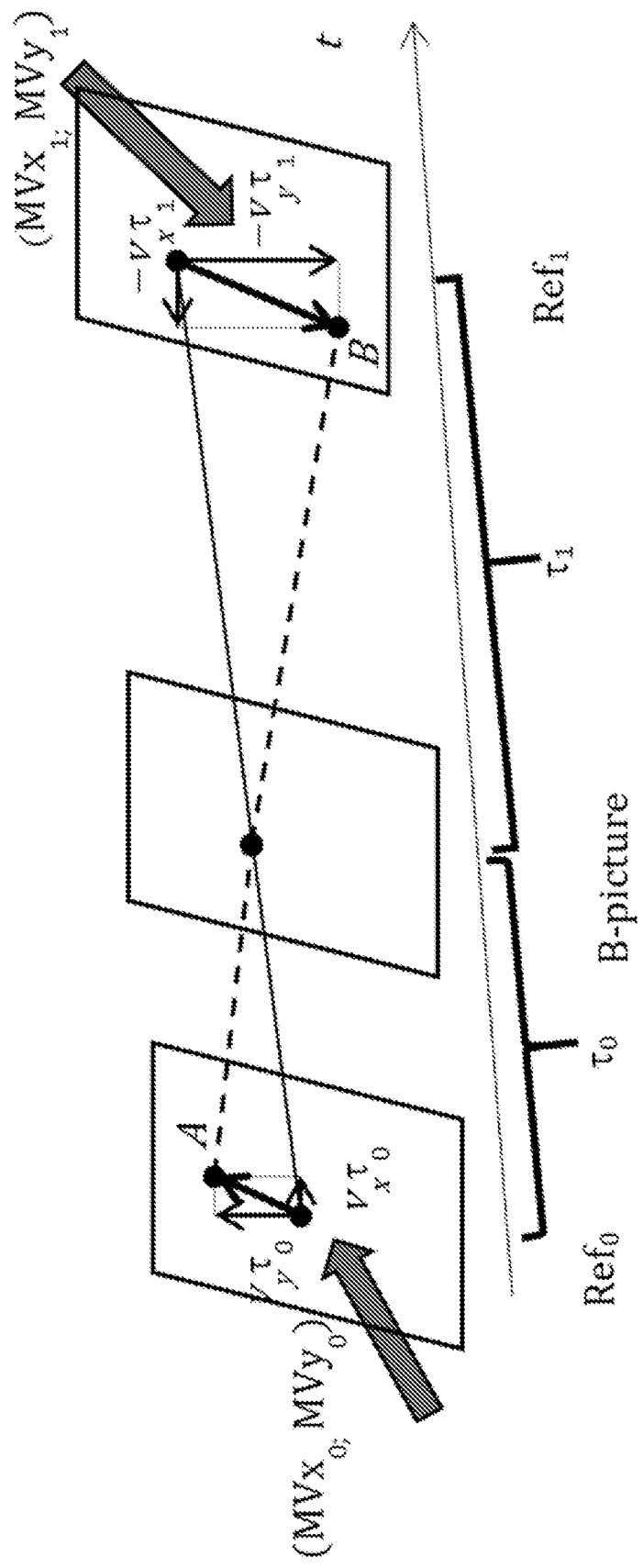

FIG. 8 shows an example of an optical flow trajectory used by the bi-directional optical flow (BIO) algorithm.

Figure 9B:
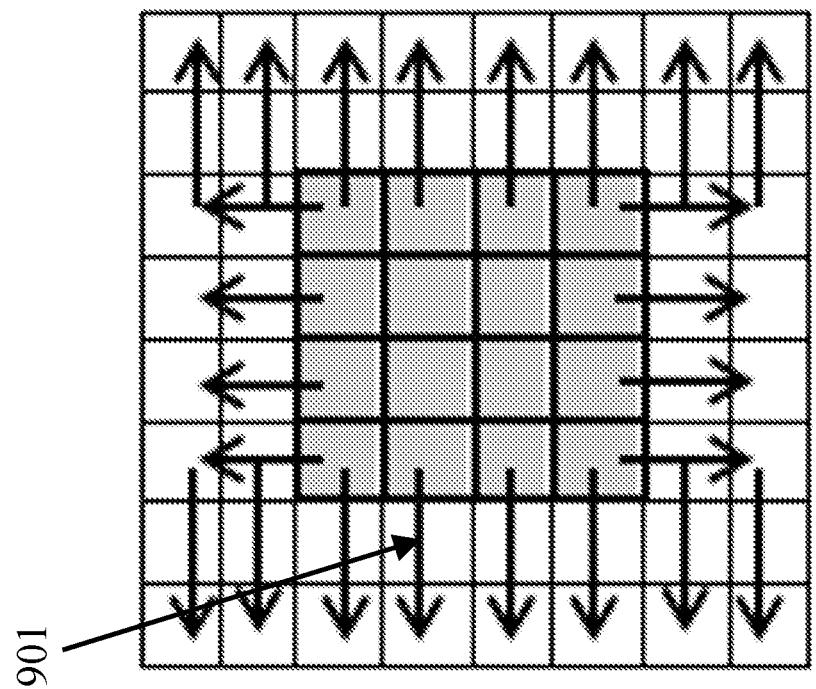
Figure 9A:
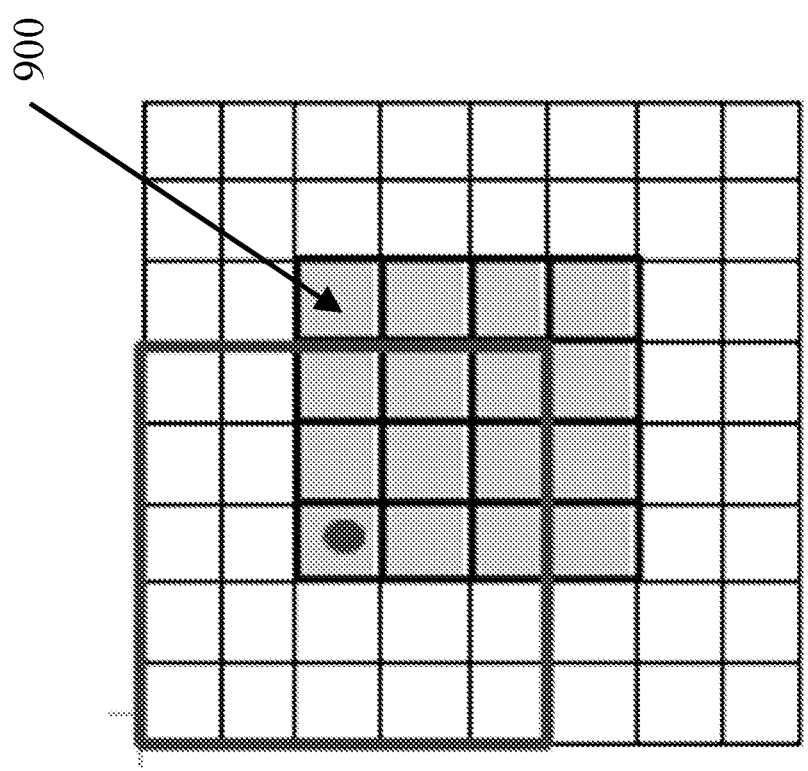

FIGS. 9A and 9B show example snapshots of using of the bi-directional optical flow (BIO) algorithm without block extensions.

FIG. 10 shows a flowchart of an example method for video encoding using intra-block copy in accordance with the disclosed technology.

FIG. 11 shows a flowchart of another example method for video encoding using intra-block copy in accordance with the disclosed technology.

Figure 12:
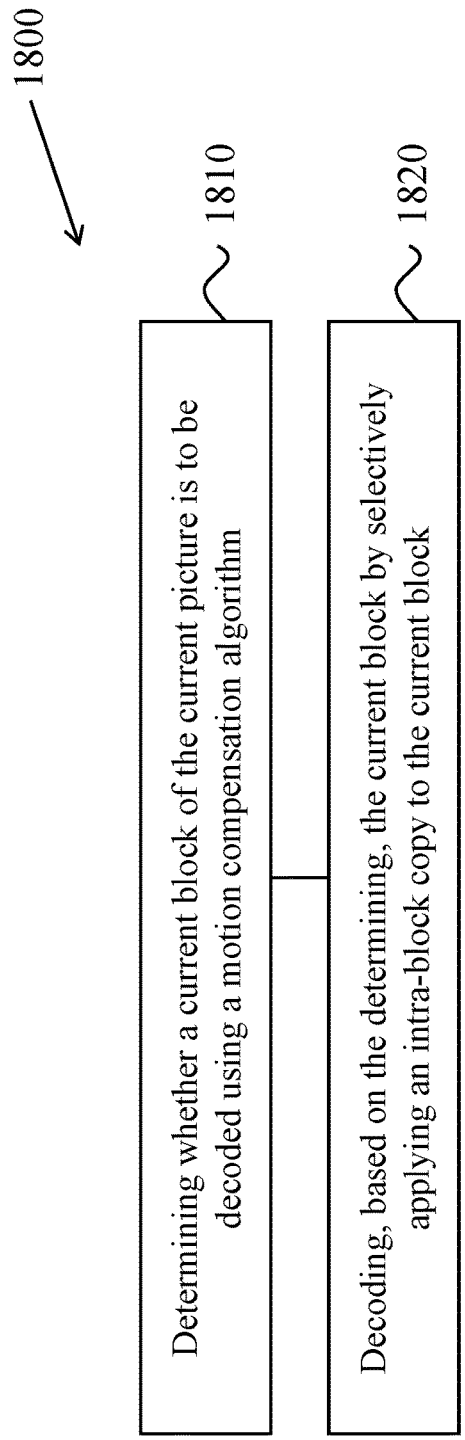

FIG. 12 shows a flowchart of an example method for video decoding using intra-block copy in accordance with the disclosed technology.

Figure 13:
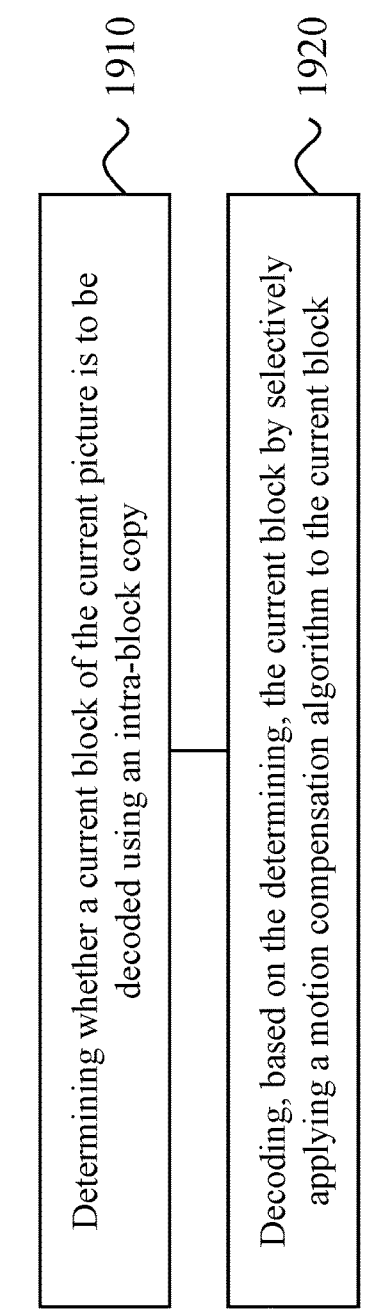

FIG. 13 shows a flowchart of another example method for video decoding using intra-block copy in accordance with the disclosed technology.

Figure 14:
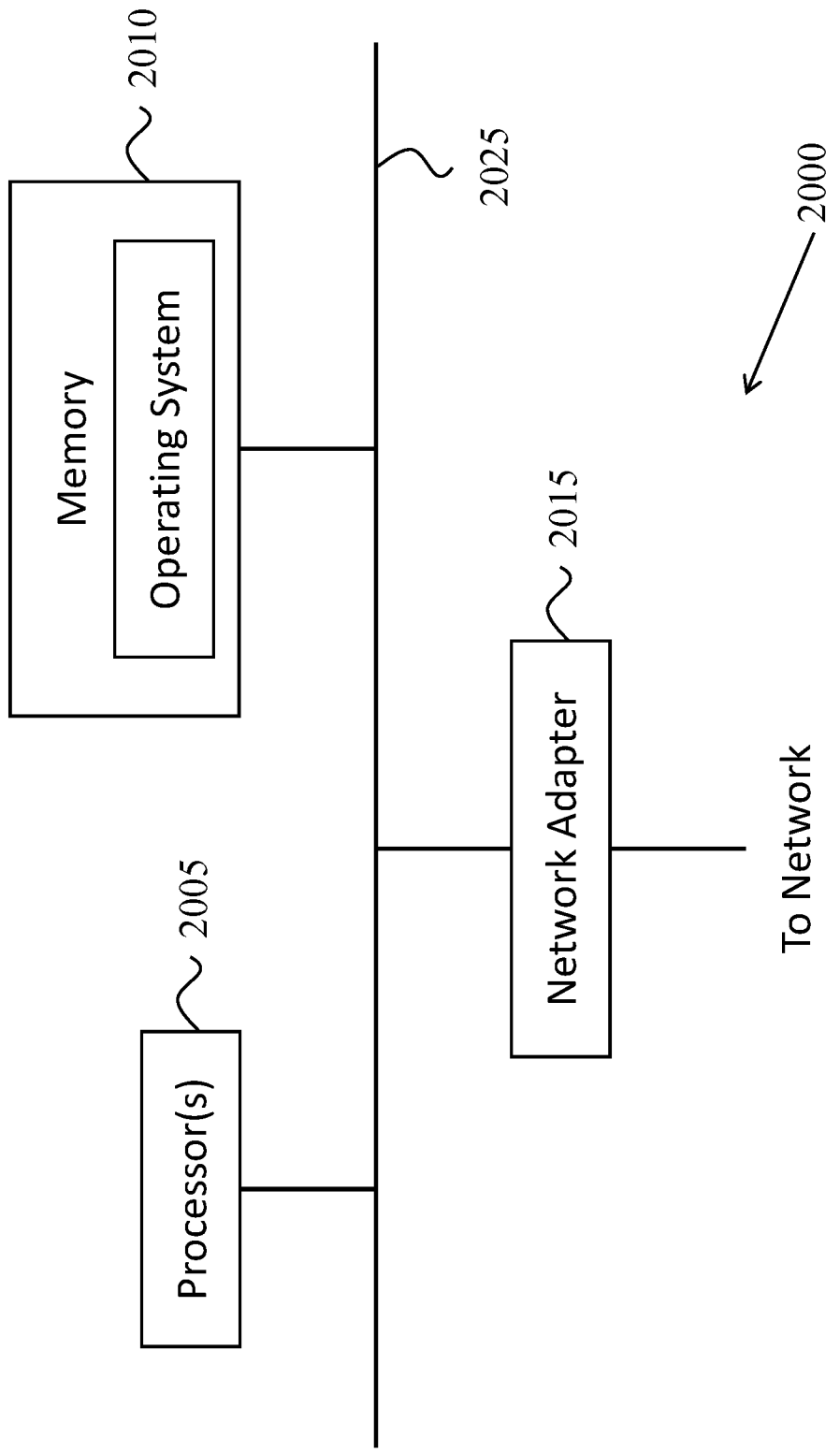

FIG. 14 is a block diagram illustrating an example of the architecture for a computer system or other control device that can be utilized to implement various portions of the presently disclosed technology.

Figure 15:
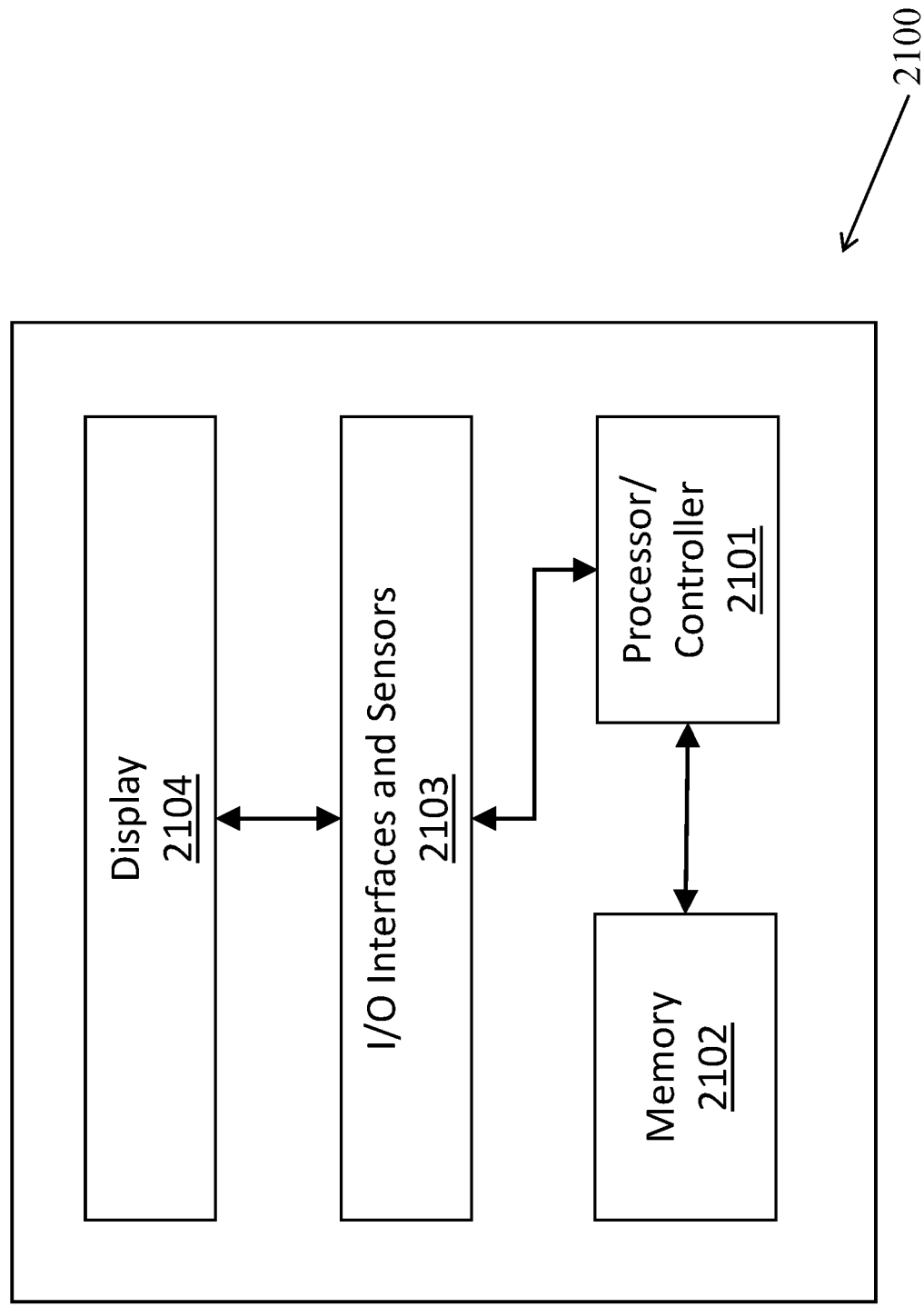

FIG. 15 shows a block diagram of an example embodiment of a mobile device that can be utilized to implement various portions of the presently disclosed technology.

Figure 16:
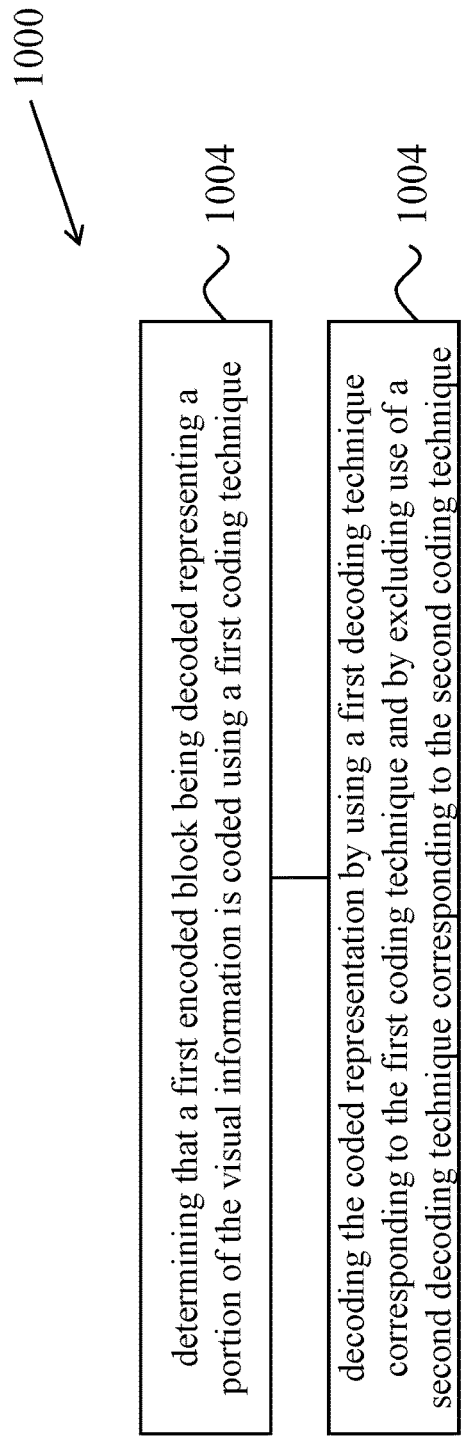

FIG. 16 is a flowchart for an example method of video processing.

Figure 17:
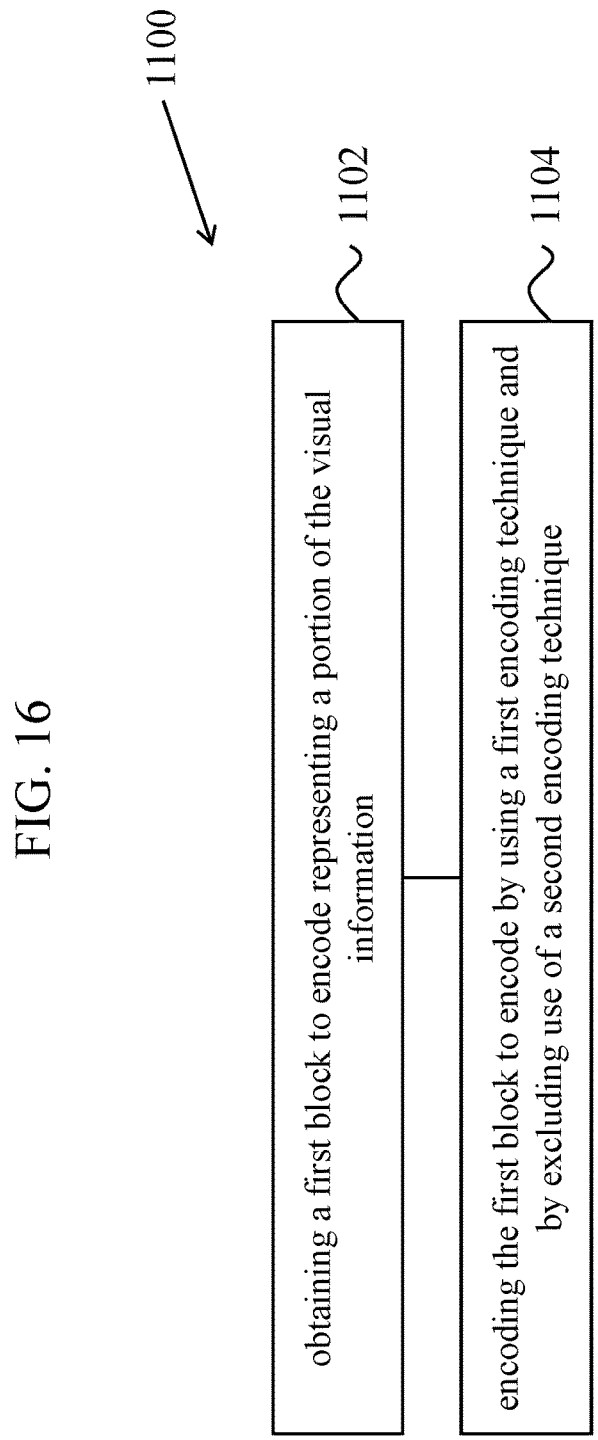

FIG. 17 is a flowchart for an example method of video processing.

DETAILED DESCRIPTION

Section headings are used in the present document for the ease of understanding and do not limit scope of the technologies and embodiments discussed in each section to just that section.

Due to the increasing demand of higher resolution visual information, such as video, images, three-dimensional scenes, etc., video coding methods and techniques are ubiquitous in modern technology. The techniques described in this application can apply to various visual information including video, images, three-dimensional scenes, etc. A picture of the visual information can be a frame in a video, a portion of an image, an object in a three-dimensional scene, a portion of the three-dimensional scene, etc. A block can be portion of the picture of the visual information such as a coding unit (CU), a largest coding unit (LCU), a sample, a prediction unit (PU) etc. as described in this application. A sub-block of the visual information can be a PU such as a sub-CU, a sample, etc. The PU can be a pixel, a voxel, or a smallest quantum of resolution of the visual information. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding standard to be finalized, or other current and/or future video coding standards.

Embodiments of the disclosed technology may be applied to existing video coding standards (e.g., HEVC, H.265) and future standards to improve runtime performance. Section headings are used in the present document to improve readability of the description and do not in any way limit the discussion or the embodiments (and/or implementations) to the respective sections only.

1. Examples of Reference Pictures and Reference Picture Lists

In HEVC, there are two types of reference pictures, short-term and long-term. A reference picture may be marked as "unused for reference" when it becomes no longer needed for prediction reference. A completely new approach for reference picture management, referred to as reference picture set (RPS) or buffer description has been introduced by HEVC.

The process of marking pictures as "used for short-term reference", "used for long-term reference", or "unused for reference" is done using the RPS concept. An RPS is a set of picture indicators that is signaled in each slice header and consists of one set of short-term pictures and one set of long-term pictures. After the first slice header of a picture has been decoded, the pictures in the DPB are marked as specified by the RPS. The pictures in the DPB that are indicated in the short-term picture part of the RPS are kept as short-term pictures. The short-term or long-term pictures in the DPB that are indicated in the long-term picture part in the RPS are converted to or kept as long-term pictures. And finally, pictures in the DPB for which there is no indicator in the RPS are marked as unused for reference. Thus, all pictures that have been decoded that may be used as references for prediction of any subsequent pictures in decoding order must be included in the RPS.

An RPS consists of a set of picture order count (POC) values that are used for identifying the pictures in the DPB. Besides signaling POC information, the RPS also signals one flag for each picture. Each flag indicates whether the corresponding picture is available or unavailable for reference for the current picture. Note that even though a reference picture is signaled as unavailable for the current picture, it is still kept in the DPB and may be made available for reference later on and used for decoding future pictures.

From the POC information and the availability flag, five lists of reference pictures as shown in Table 1 can be created. The list RefPicSetStCurrBefore consists of short-term pictures that are available for reference for the current picture and have POC values that are lower than the POC value of the current picture. RefPicSetStCurrAfter consist of available short-term pictures with a POC value that is higher than the POC value of the current picture. RefPicSetStFoll is a list that contains all short-term pictures that are made unavailable for the current picture but may be used as reference pictures for decoding subsequent pictures in decoding order. Finally, the lists RefPicSetLtCurr and RefPicSetLtFoll contain long-term pictures that are available and unavailable for reference for the current picture, respectively.

TABLE 1

List of Reference Picture lists

| Last name | Long-term or short-term | Availability flag | POC |
|---|---|---|---|
| RefPicSetStCurrBefore | Short-term | Available | Lower |
| RefPicSetStCurrAfter | Short-term | Available | Higher |
| RefPicSetStFoll | Short-term | Unavailable | — |
| RefPicSetLtCurr | Long-term | Available | — |
| RefPicSetLfFoll | Long-term | Unavailable | — |

1.1 Examples of Short-Term and Long-Term Reference Pictures

The syntax for the general sequence parameter set is shown below:

| seq_parameter_set_rbsp( ) { | Descriptor |
|---|---|
| sps_video_parameter_set_id | u(4) |
| sps_max_sub_layers_minus1 | u(3) |

| seq_parameter_set_rbsp( ) { | Descriptor |
|---|---|
|   sps_temporal_id_nesting_flag | u(1) |
|   profile_tier_level( 1, sps_max_sub_layers_minus1 ) | |
|   sps_seq_parameter_set_id | ue(v) |
|   chroma_format_idc | ue(v) |
|   if( chroma_format_idc == 3 ) | |
|   ... | |
|   } | |
| ... | |
|   amp_enabled_flag | u(1) |
|   sample_adaptive_offset_enabled_flag | u(1) |
|   pcm_enabled_flag | u(1) |
|   if( pcm_enabled_flag ) { | |
|   ... | |
|   } | |
|   num_short_term_ref_pic_sets | ue(v) |
|   for( i = 0; i < num_short_term_ref_pic_sets; i++) | |
|     st_ref_pic_set( i ) | |
|   long_term_ref_pics_present_flag | u(1) |
|   if( long_term_ref_pics_present_flag ) { | |
|     num_long_term_ref_pics_sps | ue(v) |
|     for( i = 0; i < num_long_term_ref_pics_sps; i++ ) { | |
|       lt_ref_pic_poc_lsb_sps[ i ] | u(v) |
|       used_by_curr_pic_lt_sps_flag[ i ] | u(1) |
|     } | |
|   } | |
|   sps_temporal_mvp_enabled_flag | u(1) |
| ... | |
| } | |

The syntax for the general slice segment header is shown below:

| slice_segment_header( ) { | Descriptor |
|---|---|
|   first_slice_segment_in_pic_flag | u(1) |
|   if( nal_unit_type >= BLA_W_LP && nal_unit_type <= RSV_IRAP_VCL23 ) | |
|     no_output_of_prior_pics_flag | u(1) |
|   slice_pic_parameter_set_id | ue(v) |
|   if( !first_slice_segment_in_pic_flag ) { | |
|     if( dependent_slice_segments_enabled_flag ) | |
|       dependent_slice_segment_flag | u(1) |
|     slice_segment_address | u(v) |
|   } | |
|   if( !dependent_slice_segment_flag ) { | |
|     for( i = 0; i < num_extra_slice_header_bits; i++) | |
|       slice_reserved_flag[ i ] | u(1) |
|     slice_type | ue(v) |
|     if( output_flag_present_flag ) | |
|       pic_output_flag | u(1) |
|     if( separate_colour_plane_flag == 1 ) | |
|       colour_plane_id | u(2) |
|     if( nal_unit_type != IDR_W_RADL && nal_unit_type != IDR_N_LP ) { | |
|       slice_pic_order_cnt_lsb | u(v) |
|       short_term_ref_pic_set_sps_flag | u(1) |
|       if( !short_term_ref_pic_set_sps_flag ) | |
|         st_ref_pic_set( num_short_term_ref_pic_sets ) | |
|       else if( num_short_term_ref_pic_sets > 1 ) | |
|         short_term_ref_pic_set_idx | u(v) |
|       if( long_term_ref_pics_present_flag ) { | |
|         if( num_long_term_ref_pics_sps > 0 ) | |

| slice_segment_header( ) { | Descriptor |
|---|---|
|         num_long_term_sps | ue(v) |
|         num_long_term_pics | ue(v) |
|         for( i = 0; i < num_long_term_sps + num_long_term_pics; i++ ) { | |
|           if( i < num_long_term_sps ) { | |
|             if( num_long_term_ref_pics_sps > 1 ) | |
|               lt_idx_sps[ i ] | u(v) |
|           } else { | |
|             poc_lsb_lt[ i ] | u(v) |
|             used_by_curr_pic_lt_flag[ i ] | u(1) |
|           } | |
|           delta_poc_msb_present_flag[ i ] | u(1) |
|           if( delta_poc_msb_present_flag[ i ] ) | |
|             delta_poc_msb_cycle_lt[ i ] | ue(v) |
|         } | |
|       } | |
| ... | |

The semantics used in the syntax tables above are defined as:

num_short_term_ref_pic_sets specifies the number of st_ref_pic_set( ) syntax structures included in the SPS. The value of num_short_term_ref_pic_sets shall be in the range of 0 to 64, inclusive.

In some embodiments, a decoder may allocate memory for a total number of num_short_term_ref_pic_sets+1 st_ref_pic_set( ) syntax structures since there may be a st_ref_pic_set( ) syntax structure directly signaled in the slice headers of a current picture. A st_ref_pic_set( ) syntax structure directly signaled in the slice headers of a current picture has an index equal to num_short_term_ref_pic_sets.

long_term_ref_pics_present_flag equal to 0 specifies that no long-term reference picture is used for inter prediction of any coded picture in the CVS. long_term_ref_pics_present_flag equal to 1 specifies that long-term reference pictures may be used for inter prediction of one or more coded pictures in the CVS.

num_long_term_ref_pics_sps specifies the number of candidate long-term reference pictures that are specified in the SPS. The value of num_long_term_ref_pics_sps shall be in the range of 0 to 32, inclusive.

lt_ref_pic_poc_lsb_sps[i] specifies the picture order count modulo MaxPicOrderCntLsb of the i-th candidate long-term reference picture specified in the SPS. The number of bits used to represent lt_ref_pic_poc_lsb_sps[i] is equal to log 2_max_pic_order_cnt_lsb_minus4+4.

used_by_curr_pic_it_sps_flag[i] equal to 0 specifies that the i-th candidate long-term reference picture specified in the SPS is not used for reference by a picture that includes in its long-term reference picture set (RPS) the i-th candidate long-term reference picture specified in the SPS.

short_term_ref_pic_set_sps_flag equal to 1 specifies that the short-term RPS of the current picture is derived based on one of the st_ref_pic_set( ) syntax structures in the active SPS that is identified by the syntax element short_term_ref_pic_set_idx in the slice header. short_term_ref_pic_set_sps_flag equal to 0 specifies that the short-term RPS of the current picture is derived based on the st_ref_pic_set( ) syntax structure that is directly included in the slice headers of the current picture. When num_short_term_ref_pic_sets is equal to 0, the value of short_term_ref_pic_set_sps_flag shall be equal to 0.

short_term_ref_pic_set_idx specifies the index, into the list of the st_ref_pic_set( ) syntax structures included in the active SPS, of the st_ref_pic_set( ) syntax structure that is used for derivation of the short-term RPS of the current picture. The syntax element short_term_ref_pic_set_idx is represented by Ceil(Log 2(num_short_term_ref_pic_sets)) bits. When not present, the value of short_term_ref_pic_set_idx is inferred to be equal to 0. The value of short_term_ref_pic_set_idx shall be in the range of 0 to num_short_term_ref_pic_sets−1, inclusive.

In some embodiments, the variable CurrRpsIdx is derived as follows:
If short_term_ref_pic_set_sps_flag is equal to 1, CurrRpsIdx is set equal to short_term_ref_pic_set_idx.
Otherwise, CurrRpsIdx is set equal to num_short_term_ref_pic_sets.

num_long_term_sps specifies the number of entries in the long-term RPS of the current picture that are derived based on the candidate long-term reference pictures specified in the active SPS. The value of num_long_term_sps shall be in the range of 0 to num_long_term_ref_pics_sps, inclusive. When not present, the value of num_long_term_sps is inferred to be equal to 0.

num_long_term_pics specifies the number of entries in the long-term RPS of the current picture that are directly signaled in the slice header. When not present, the value of num_long_term_pics is inferred to be equal to 0.

In some embodiments, when nuh_layer_id is equal to 0, the value of num_long_term_pics shall be less than or equal to sps_max_dec_pic_buffering_minus1[TemporalId]−NumNegativePics[CurrRpsIdx]−NumPositivePics[CurrRpsIdx]−num_long_term_sps−TwoVersionsOfCurrDecPicFlag.

lt_idx_sps[i] specifies an index, into the list of candidate long-term reference pictures specified in the active SPS, of the i-th entry in the long-term RPS of the current picture. The number of bits used to represent lt_idx_sps[i] is equal to Ceil(Log 2(num_long_term_ref_pics_sps)). When not present, the value of lt_idx_sps[i] is inferred to be equal to 0. The value of lt_idx_sps[i] shall be in the range of 0 to num_long_term_ref_pics_sps−1, inclusive.

poc_lsb_it[i] specifies the value of the picture order count modulo MaxPicOrderCntLsb of the i-th entry in the long-term RPS of the current picture. The length of the poc_lsb_lt[i] syntax element is log 2_max_pic_order_cnt_lsb_minus4+4 bits.

used_by_curr_pic_it_flag[i] equal to 0 specifies that the i-th entry in the long-term RPS of the current picture is not used for reference by the current picture.

In some embodiments, the variables PocLsbLt[i] and UsedByCurrPicLt[i] are derived as follows:
If i is less than num_long_term_sps, PocLsbLt[i] is set equal to lt_ref_pic_poc_lsb_sps[lt_idx_sps[i]] and UsedByCurrPicLt[i] is set equal to used_by_curr_pic_lt_sps_flag[lt_idx_sps[i]].
Otherwise, PocLsbLt[i] is set equal to poc_lsb_lt[i] and UsedByCurrPicLt[i] is set equal to used_by_curr_pic_lt_flag[i].

delta_poc_msb_present_flag[i] equal to 1 specifies that delta_poc_msb_cycle_lt[i] is present. delta_poc_msb_present_flag[i] equal to 0 specifies that delta_poc_msb_cycle_lt[i] is not present.

In some embodiments, let prevTid0Pic be the previous picture in decoding order that has TemporalId equal to 0 and is not a RASL, RADL or SLNR picture. Let setOfPrevPocVals be a set consisting of the following:
the PicOrderCntVal of prevTid0Pic,
the PicOrderCntVal of each picture in the RPS of prevTid0Pic,
the PicOrderCntVal of each picture that follows prevTid0Pic in decoding order and precedes the current picture in decoding order.

In some embodiments, when there is more than one value in setOfPrevPocVals for which the value modulo MaxPicOrderCntLsb is equal to PocLsbLt[i], delta_poc_msb_present_flag[i] shall be equal to 1.

delta_poc_msb_cycle_it[i] is used to determine the value of the most significant bits of the picture order count value of the i-th entry in the long-term RPS of the current picture. When delta_poc_msb_cycle_lt[i] is not present, it is inferred to be equal to 0.

In some embodiments, the variable DeltaPocMsbCycleLt[i] is derived as follows:
if(i==0|i==num_long_term_sps) DeltaPocMsbCycleLt[i]=delta_poc_msb_cycle_lt[i] else DeltaPocMsbCycleLt[i]=delta_poc_msb_cycle_lt[i]+DeltaPocMsbCycleLt[i−1]

1.2 Examples of Motion Vector Prediction (MVP) Between Short-Term and Long-Term Reference Pictures In some embodiments, the motion vector prediction is only allowed if the target reference picture type and the predicted reference picture type is the same. In other words, when the types are different, motion vector prediction is disallowed.

Advanced Motion Vector Prediction (AMVP) is an example of motion vector prediction that includes an existing implementation. The relevant portion of the existing AMVP implementation is detailed below.

The motion vector mvLXA and the availability flag availableFlagLXA are derived in the following ordered steps:
(1) The sample location (xNbA0, yNbA0) is set equal to (xPb−1, yPb+nPbH) and the sample location (xNbA1, yNbA1) is set equal to (xNbA0, yNbA0−1).
(7) When availableFlagLXA is equal to 0, the following applies for (xNbAk, yNbAk) from (xNbA0, yNbA0) to (xNbA1, yNbA1) or until availableFlagLXA is equal to 1:
When availableAk is equal to TRUE and availableFlagLXA is equal to 0, the following applies:
If PredFlagLX[xNbAk][yNbAk] is equal to 1 and LongTermRefPic(currPic, currPb, refIdxLX, RefPicListX) is equal to LongTermRefPic(currPic, currPb, RefIdxLX[xNbAk][yNbAk], RefPicListX), availableFlagLXA is set equal to 1 and the following assignments are made:
mvLXA=MvLX[xNbAk][yNbAk]
refIdxA=RefIdxLX[xNbAk][yNbAk]
refPicListA=RefPicListX
Otherwise, when PredFlagLY[xNbAk][yNbAk] (with Y=!X) is equal to 1 and LongTermRefPic(currPic, currPb, refIdxLX, RefPicListX) is equal to LongTermRefPic(currPic, currPb, RefIdxLY[xNbAk][yNbAk], RefPicListY), availableFlagLXA is set to 1.

The motion vector mvLXB and the availability flag availableFlagLXB are derived in the following ordered steps:
(1) The sample locations (xNbB0, yNbB0), (xNbB1, yNbB1) and (xNbB2, yNbB2) are set equal to (xPb+nPbW, yPb−1), (xPb+nPbW−1, yPb−1) and (xPb−1, yPb−1), respectively.
(5) When isScaledFlagLX is equal to 0, availableFlagLXB is set equal to 0 and the following applies for (xNbBk, yNbBk) from (xNbB0, yNbB0) to (xNbB2, yNbB2) or until availableFlagLXB is equal to 1:
The availability derivation process for a prediction block as specified in clause 6.4.2 is invoked with the luma location (xCb, yCb), the current luma coding block size nCbS, the luma location (xPb, yPb), the luma prediction block width nPbW, the luma prediction block height nPbH, the luma location (xNbY, yNbY) set equal to (xNbBk, yNbBk) and the partition index partIdx as inputs, and the output is assigned to the prediction block availability flag availableBk.

When availableBk is equal to TRUE and availableFlagLXB is equal to 0, the following applies:

If PredFlagLX[xNbBk][yNbBk] is equal to 1 and LongTermRefPic(currPic, currPb, refIdxLX, RefPicListX) is equal to LongTermRefPic(currPic, currPb, RefIdxLX [xNbBk][yNbBk], RefPicListX), availableFlagLXB is set equal to 1 and the following assignments are made:

mvLXB=MvLX[xNbBk][yNbBk]

refIdxB=RefIdxLX[xNbBk][yNbBk]

refPicListB=RefPicListX

Otherwise, when PredFlagLY[xNbBk][yNbBk] (with Y=!X) is equal to 1 and LongTermRefPic(currPic, currPb, refIdxLX, RefPicListX) is equal to LongTermRefPic(currPic, currPb, RefIdxLY[xNbBk][yNbBk], RefPicListY), availableFlagLXB is set equal to 1 and the following assignments are made:

mvLXB=MvLY[xNbBk][yNbBk].

Temporal Motion Vector Prediction (TMVP) is another example of motion vector prediction that includes an existing implementation. The relevant portion of the existing TMVP implementation is detailed below.

The variables mvLXCol and availableFlagLXCol are derived as follows:

If LongTermRefPic(currPic, currPb, refIdxLX, LX) is not equal to LongTermRefPic(ColPic, colPb, refIdxCol, listCol), both components of mvLXCol are set equal to 0 and availableFlagLXCol is set equal to 0.

Otherwise, the variable availableFlagLXCol is set equal to 1, refPicListCol[refIdxCol] is set to be the picture with reference index refIdxCol in the reference picture list listCol of the slice containing prediction block colPb in the collocated picture specified by ColPic.

2. Example Embodiments of Intra-Block Copy (IBC)

Figure 1:
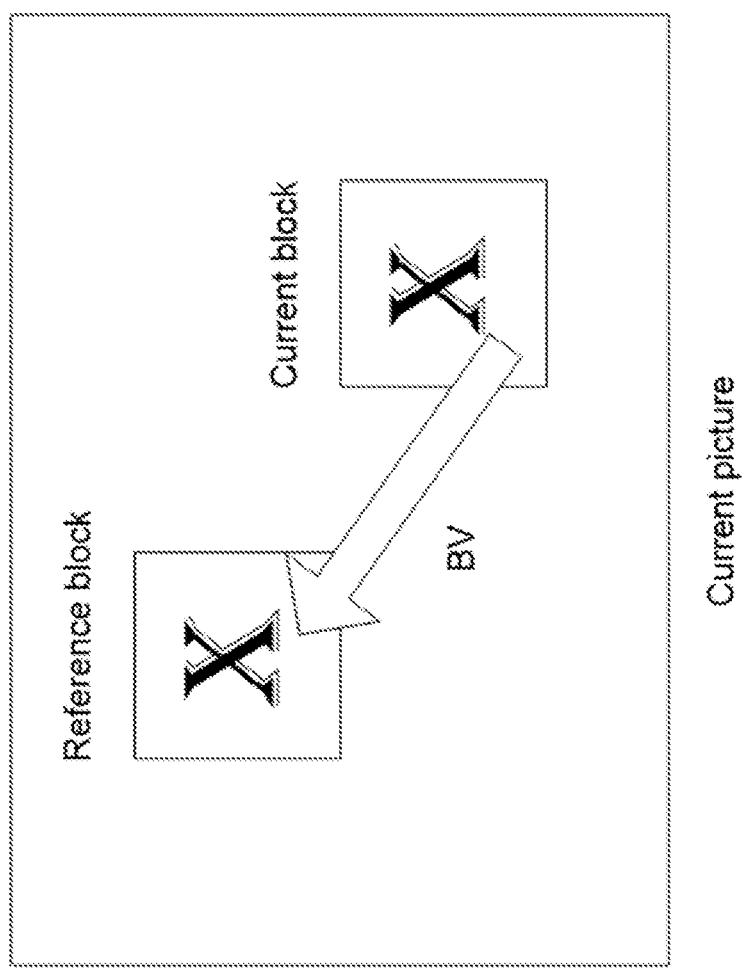
FIG. 1 shows an example of an intra-block copy technique.

Intra-block copy (IBC) has been extends the concept of motion compensation from inter-frame coding to intra-frame coding. As shown in FIG. 1, the current block is predicted by a reference block in the same picture when IBC is applied. The samples in the reference block must have been already reconstructed before the current block is coded or decoded. Although IBC is not so efficient for most camera-captured sequences, it shows significant coding gains for screen content. The reason is that there are lots of reduplicated patterns, such as icons and text characters in a screen content picture. IBC can remove the redundancy between these reduplicated patterns effectively.

In HEVC-SCC, an inter-coded coding unit (CU) can apply IBC if it chooses the current picture as its reference picture. The MV is renamed as block vector (BV) in this case, and a BV always has an integer-pixel precision. To be compatible with main profile HEVC, the current picture is marked as a "long-term" reference picture in the Decoded Picture Buffer (DPB). It should be noted that similarly, in multiple view/3D video coding standards, the inter-view reference picture is also marked as a "long-term" reference picture.

2.1 Embodiments of Picture Marking when IBC is Enabled

Semantics related to IBC in PPS. pps_curr_pic_ref_enabled_flag equal to 1 specifies that a picture referring to the PPS may be included in a reference picture list of a slice of the picture itself. pps_curr_pic_ref_enabled_flag equal to 0 specifies that a picture referring to the PPS is never included in a reference picture list of a slice of the picture itself. When not present, the value of pps_curr_pic_ref_enabled_flag is inferred to be equal to 0.

It is a requirement of bitstream conformance that when sps_curr_pic_ref_enabled_flag is equal to 0, the value of pps_curr_pic_ref_enabled_flag shall be equal to 0.

The variable TwoVersionsOfCurrDecPicFlag is derived as follows:

TwoVersionsOfCurrDecPicFlag=pps_curr_pic_ref_enabled_flag && (sample_adaptive_offset_enabled_flag||!pps_deblocking_filter_disabled_flag||deblocking_filter_override_enabled_flag)

When sps_max_dec_pic_buffering_minus1[TemporalId] is equal to 0, the value of TwoVersionsOfCurrDecPicFlag shall be equal to 0.

Decoding process. The current decoded picture after the invocation of the in-loop filter process is stored in the DPB in an empty picture storage buffer, the DPB fullness is incremented by one and this picture is marked as "used for short-term reference".

When TwoVersionsOfCurrDecPicFlag is equal to 1, the current decoded picture before the invocation of the in-loop filter process as specified in clause F.8.7 [1] is stored in the DPB in an empty picture storage buffer, the DPB fullness is incremented by one, and this picture is marked as "used for long-term reference".

3. Examples of the Joint Exploration Model (JEM)

In some embodiments, future video coding technologies are explored using a reference software known as the Joint Exploration Model (JEM). In JEM, sub-block based prediction is adopted in several coding tools, such as affine prediction, alternative temporal motion vector prediction (ATMVP), spatial-temporal motion vector prediction (STMVP), bi-directional optical flow (BIO), Frame-Rate Up Conversion (FRUC), Locally Adaptive Motion Vector Resolution (LAMVR), Overlapped Block Motion Compensation (OBMC), Local Illumination Compensation (LIC), and Decoder-side Motion Vector Refinement (DMVR).

3.1 Examples of Affine Prediction

Figure 2:
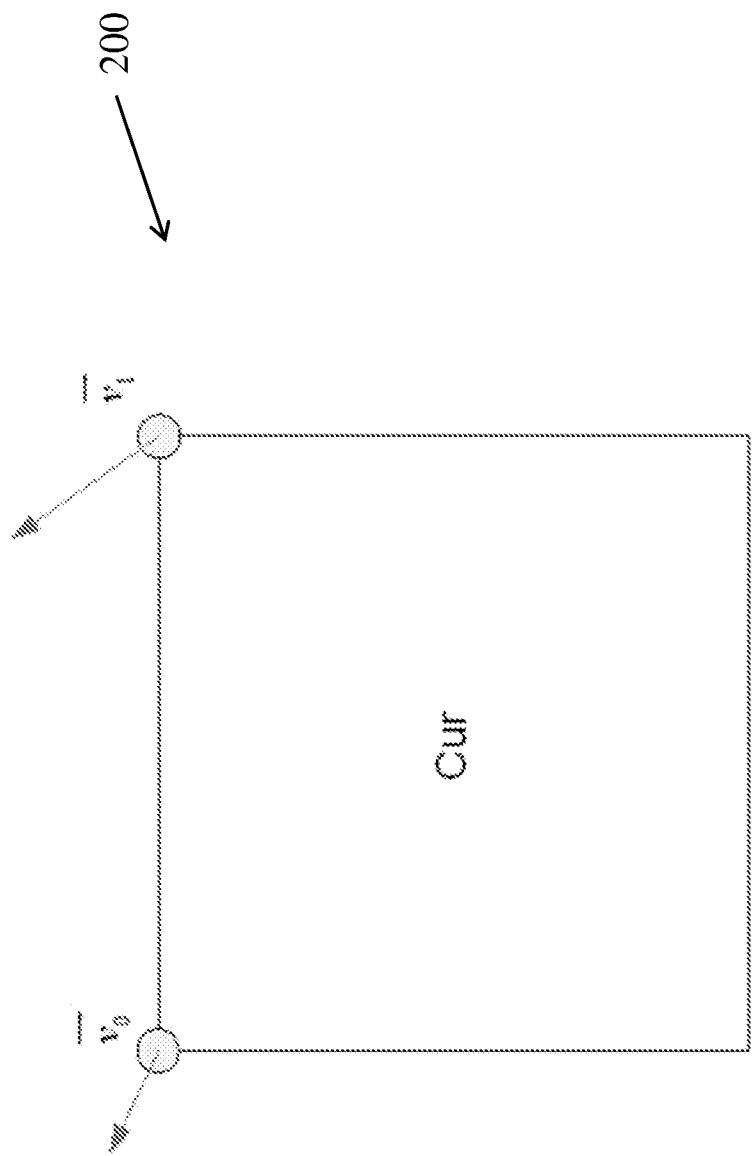
FIG. 2 shows an example of a simplified affine motion model.

In HEVC, only a translation motion model is applied for motion compensation prediction (MCP). However, the camera and objects may have many kinds of motion, e.g. zoom in/out, rotation, perspective motions, and/or other irregular motions. JEM, on the other hand, applies a simplified affine transform motion compensation prediction. FIG. 2 shows an example of an affine motion field of a block 200 described by two control point motion vectors $V_0$ and $V_1$. The motion vector field (MVF) of the block 200 can be described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad \text{Eq. (1)}$$

As shown in FIG. 2, $(v_{0x}, v_{0y})$ is motion vector of the top-left corner control point, and $(v_{1x}, v_{1y})$ is motion vector of the top-right corner control point. To simplify the motion compensation prediction, sub-block based affine transform prediction can be applied. The sub-block size M×N is derived as follows:

$$\begin{cases} M = \text{clip3}\left(4, w, \dfrac{w \times MvPre}{\max(\text{abs}(v_{1x} - v_{0x}), \text{abs}(v_{1y} - v_{0y}))}\right) \\ N = \text{clip3}\left(4, h, \dfrac{h \times MvPre}{\max(\text{abs}(v_{2x} - v_{0x}), \text{abs}(v_{2y} - v_{0y}))}\right) \end{cases} \quad \text{Eq. (2)}$$

Here, MvPre is the motion vector fraction accuracy (e.g., 1/16 in JEM). $(v_{2x}, v_{2y})$ is motion vector of the bottom-left control point, calculated according to Eq. (1). M and N can be adjusted downward if necessary to make it a divisor of w and h, respectively.

Figure 3:
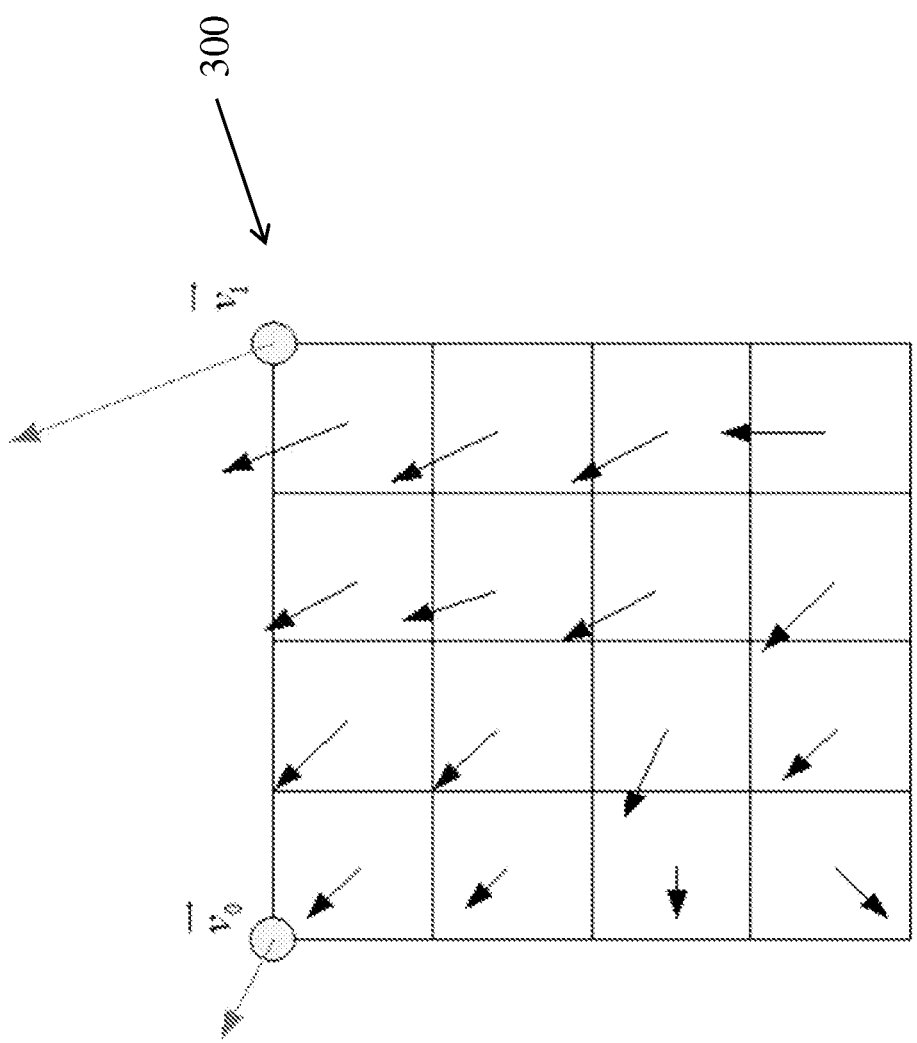
FIG. 3 shows an example of an affine motion vector field (MVF) per sub-block.

FIG. 3 shows an example of affine MVF per sub-block for a block 300. To derive motion vector of each M×N sub-block, the motion vector of the center sample of each sub-block can be calculated according to Eq. (1), and rounded to the motion vector fraction accuracy (e.g., 1/16 in JEM). Then the motion compensation interpolation filters can be applied to generate the prediction of each sub-block with derived motion vector. After the MCP, the high accuracy motion vector of each sub-block is rounded and saved as the same accuracy as the normal motion vector.

In the JEM, there are two affine motion modes: AF_INTER mode and AF_MERGE mode. For CUs with both width and height larger than 8, AF_INTER mode can be applied. An affine flag in CU level is signaled in the bitstream to indicate whether AF_INTER mode is used. In the AF_INTER mode, a candidate list with motion vector pair $\{(v_0, v_1)|v_0=\{v_A, v_B, v_C\}, v_1 \{v_D, v_E\}\}$ is constructed using the neighboring blocks.

Figure 4:
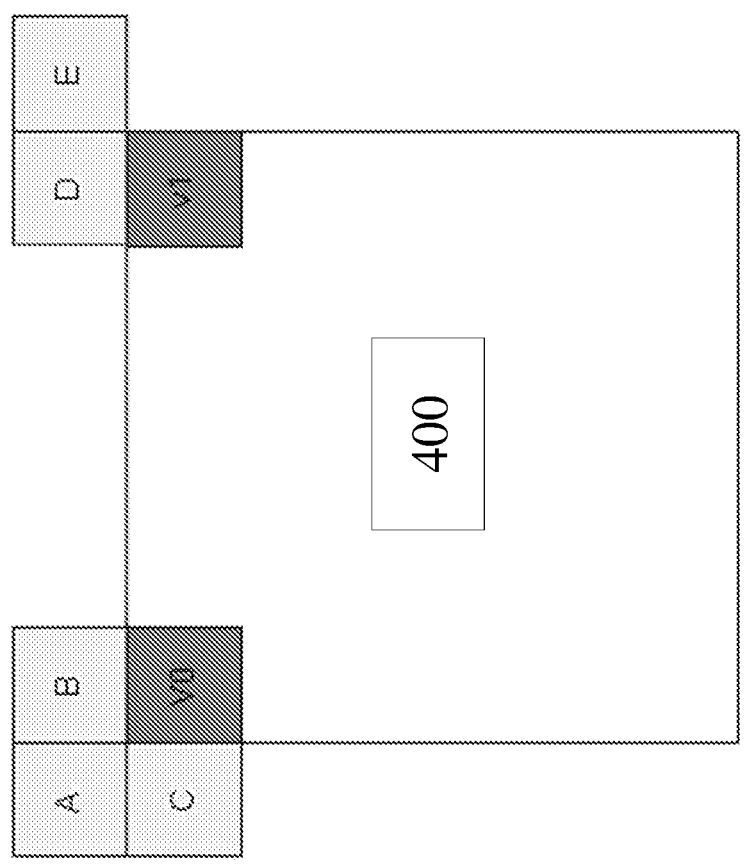

FIG. 4 shows an example of motion vector prediction (MVP) for a block 400 in the AF_INTER mode. As shown in FIG. 4, $v_0$ is selected from the motion vectors of the sub-block A, B, or C. The motion vectors from the neighboring blocks can be scaled according to the reference list. The motion vectors can also be scaled according to the relationship among the Picture Order Count (POC) of the reference for the neighboring block, the POC of the reference for the current CU, and the POC of the current CU. The approach to select $v_1$ from the neighboring sub-block D and E is similar. If the number of candidate list is smaller than 2, the list is padded by the motion vector pair composed by duplicating each of the AMVP candidates. When the candidate list is larger than 2, the candidates can be firstly sorted according to the neighboring motion vectors (e.g., based on the similarity of the two motion vectors in a pair candidate). In some implementations, the first two candidates are kept. In some embodiments, a Rate Distortion (RD) cost check is used to determine which motion vector pair candidate is selected as the control point motion vector prediction (CPMVP) of the current CU. An index indicating the position of the CPMVP in the candidate list can be signaled in the bitstream. After the CPMVP of the current affine CU is determined, affine motion estimation is applied and the control point motion vector (CPMV) is found. Then the difference of the CPMV and the CPMVP is signaled in the bitstream.

When a CU is applied in AF_MERGE mode, it gets the first block coded with an affine mode from the valid neighboring reconstructed blocks. FIG. 5A shows an example of the selection order of candidate blocks for a current CU 500. As shown in FIG. 5A, the selection order can be from left (501), above (502), above right (503), left bottom (504) to above left (505) of the current CU 500. FIG. 5B shows another example of candidate blocks for a current CU 500 in the AF_MERGE mode. If the neighboring left bottom block 501 is coded in affine mode, as shown in FIG. 5B, the motion vectors $v_2$, $v_3$ and $v_4$ of the top left corner, above right corner, and left bottom corner of the CU containing the sub-block 501 are derived. The motion vector $v_0$ of the top left corner on the current CU 500 is calculated based on v2, v3 and v4. The motion vector v1 of the above right of the current CU can be calculated accordingly.

After the CPMV of the current CU v0 and v1 are computed according to the affine motion model in Eq. (1), the MVF of the current CU can be generated. In order to identify whether the current CU is coded with AF_MERGE mode, an affine flag can be signaled in the bitstream when there is at least one neighboring block is coded in affine mode.

3.2 Examples of Alternative Temporal Motion Vector Prediction (ATMVP)

In the ATMVP method, the temporal motion vector prediction (TMVP) method is modified by fetching multiple sets of motion information (including motion vectors and reference indices) from blocks smaller than the current CU.

FIG. 6 shows an example of ATMVP motion prediction process for a CU 600. The ATMVP method predicts the motion vectors of the sub-CUs 601 within a CU 600 in two steps. The first step is to identify the corresponding block 651 in a reference picture 650 with a temporal vector. The reference picture 650 is also referred to as the motion source picture. The second step is to split the current CU 600 into sub-CUs 601 and obtain the motion vectors as well as the reference indices of each sub-CU from the block corresponding to each sub-CU.

In the first step, a reference picture 650 and the corresponding block is determined by the motion information of the spatial neighboring blocks of the current CU 600. To avoid the repetitive scanning process of neighboring blocks, the first merge candidate in the merge candidate list of the current CU 600 is used. The first available motion vector as well as its associated reference index are set to be the temporal vector and the index to the motion source picture. This way, the corresponding block may be more accurately identified, compared with TMVP, wherein the corresponding block (sometimes called collocated block) is always in a bottom-right or center position relative to the current CU.

In the second step, a corresponding block of the sub-CU 651 is identified by the temporal vector in the motion source picture 650, by adding to the coordinate of the current CU the temporal vector. For each sub-CU, the motion information of its corresponding block (e.g., the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (e.g. the POCs of all reference pictures of the current picture are smaller than the POC of the current picture) is fulfilled and possibly uses motion vector MVx (e.g., the motion vector corresponding to reference picture list X) to predict motion vector MVy (e.g., with X being equal to 0 or 1 and Y being equal to 1−X) for each sub-CU.

3.3 Examples of Spatial-Temporal Motion Vector Prediction (STMVP)

In the STMVP method, the motion vectors of the sub-CUs are derived recursively, following raster scan order. FIG. 7 shows an example of one CU with four sub-blocks and neighboring blocks. Consider an 8×8 CU 700 that includes four 4×4 sub-CUs A (701), B (702), C (703), and D (704). The neighboring 4×4 blocks in the current frame are labelled as a (711), b (712), c (713), and d (714).

The motion derivation for sub-CU A starts by identifying its two spatial neighbors. The first neighbor is the N×N block above sub-CU A 701 (block c 713). If this block c (713) is not available or is intra coded the other N×N blocks above sub-CU A (701) are checked (from left to right, starting at block c 713). The second neighbor is a block to the left of the sub-CU A 701 (block b 712). If block b (712) is not available or is intra coded other blocks to the left of sub-CU A 701 are checked (from top to bottom, staring at block b 712). The motion information obtained from the neighboring blocks for each list is scaled to the first reference frame for a given list. Next, temporal motion vector predictor (TMVP) of sub-block A 701 is derived by following the same procedure of TMVP derivation as specified in HEVC. The motion information of the collocated block at block D 704 is fetched and scaled accordingly. Finally, after retrieving and scaling the motion information, all available motion vectors are averaged separately for each reference list. The averaged motion vector is assigned as the motion vector of the current sub-CU.

3.4 Examples of Bi-Directional Optical Flow (BIO)

The bi-directional optical flow (BIO) method is a sample-wise motion refinement performed on top of block-wise motion compensation for bi-prediction. In some implementations, the sample-level motion refinement does not use signaling.

Let $I^{(k)}$ be the luma value from reference k (k=0, 1) after block motion compensation, and $\partial I^{(k)}/\partial x$, $\partial I^{(k)}/\partial y$ are horizontal and vertical components of the $I^{(k)}$ gradient, respectively. Assuming the optical flow is valid, the motion vector field $(v_x, v_y)$ is given by:

$$\partial I^{(k)}/\partial t + v_x \partial I^{(k)}/\partial x + v_y \partial I^{(k)}/\partial y = 0. \quad \text{Eq. (3)}$$

Combining this optical flow equation with Hermite interpolation for the motion trajectory of each sample results in a unique third-order polynomial that matches both the function values $I^{(k)}$ and derivatives $\partial I^{(k)}/\partial x$, $\partial I^{(k)}/\partial y$ at the ends. The value of this polynomial at t=0 is the BIO prediction:

$$\text{pred}_{BIO}=\tfrac{1}{2}\cdot(I^{(0)}+I^{(1)}+v_x/2\cdot(\tau_1 \partial I^{(1)}/\partial x - \tau_0 \partial I^{(0)}/\partial x)+v_y/2\cdot (\tau_1 \partial I^{(1)}/\partial y - \tau_0 \partial I^{(0)}/\partial y)). \quad \text{Eq. (4)}$$

FIG. 8 shows an example optical flow trajectory in the Bi-directional Optical flow (BIO) method. Here, $\tau_0$ and $\tau_1$ denote the distances to the reference frames. Distances $\tau_0$ and $\tau_1$ are calculated based on POC for $\text{Ref}_0$ and $\text{Ref}_1$: $\tau_0=\text{POC(current)}-\text{POC(Ref}_0)$, $\tau_1=\text{POC(Ref}_1)-\text{POC(current)}$. If both predictions come from the same time direction (either both from the past or both from the future) then the signs are different (e.g., $\tau_0 \cdot \tau_1 < 0$). In this case, BIO is applied if the prediction is not from the same time moment (e.g., $\tau_0 \neq \tau_1$). Both referenced regions have non-zero motion (e.g., $MVx_0, MVy_0, MVx_1, MVy_1 \neq 0$) and the block motion vectors are proportional to the time distance (e.g., $MVx_0/MVx_1=MVy_0/MVy_1=-\tau_0/\tau_1$).

The motion vector field $(v_x, v_y)$ is determined by minimizing the difference $\Delta$ between values in points A and B. FIGS. 9A-9B show an example of intersection of motion trajectory and reference frame planes. Model uses only first linear term of a local Taylor expansion for $\Delta$:

$$\Delta=(I^{(0)}-I^{(1)}{}_0+v_x(\tau_1 \partial I^{(1)}/\partial x+\tau_0 \partial I^{(0)}/\partial x)+v_y(\tau_1 \partial I^{(1)}/\partial y+\tau_0 \partial I^{(0)}/\partial y)) \quad \text{Eq. (5)}$$

All values in the above equation depend on the sample location, denoted as (i', j'). Assuming the motion is consistent in the local surrounding area, $\Delta$ can be minimized inside the (2M+1)×(2M+1) square window $\Omega$ centered on the currently predicted point (i, j), where M is equal to 2:

$$(v_x, v_y) = \underset{v_x,v_y}{\operatorname{argmin}} \sum_{[i',j']\in\Omega} \Delta^2[i', j'] \quad \text{Eq. (6)}$$

For this optimization problem, the JEM uses a simplified approach making first a minimization in the vertical direction and then in the horizontal direction. This results in the following:

$$v_x = (s_1 + r) > m\,?\ \text{clip3}\left(-thBIO, thBIO, -\frac{s_3}{(s_1+r)}\right) : 0 \quad \text{Eq. (7)}$$

$$v_y = (s_5 + r) > m\,?\ \text{clip3}\left(-thBIO, thBIO, -\frac{s_6 - v_x s_2/2}{(s_5+r)}\right) : 0 \quad \text{Eq. (8)}$$

where, $$s_1 = \sum_{[i',j']\in\Omega} (\tau_1 \partial I^{(1)}/\partial x + \tau_0 \partial I^{(0)}/\partial x)^2; \quad \text{Eq. (9)}$$

$$s_3 = \sum_{[i',j']\in\Omega} (I^{(1)} - I^{(0)})(\tau_1 \partial I^{(1)}/\partial x + \tau_0 \partial I^{(0)}/\partial x);$$

$$s_2 = \sum_{[i',j']\in\Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y);$$

$$s_5 = \sum_{[i',j']\in\Omega} (\tau_1 \partial I^{(1)}/\partial y + \tau_0 \partial I^{(0)}/\partial y)^2;$$

$$s_6 = \sum_{[i',j']\in\Omega} (I^{(1)} - I^{(0)})(\tau_1 \partial I^{(1)}/\partial y + \tau_0 \partial I^{(0)}/\partial y)$$

In order to avoid division by zero or a very small value, regularization parameters r and m can be introduced in Eq. (7) and Eq. (8), where:

$$r=500\cdot 4^{d-8} \quad \text{Eq. (10)}$$

$$m=700\cdot 4^{d-8} \quad \text{Eq. (11)}$$

Here, d is bit depth of the video samples.

In order to keep the memory access for BIO the same as for regular bi-predictive motion compensation, all prediction and gradients values, $I^{(k)}$, $\partial I^{(k)}/\partial x$, $\partial I^{(k)}/\partial y$ are calculated for positions inside the current block. FIG. 9A shows an example of access positions outside of a block 900. As shown in FIG. 9A, in Eq. (9), (2M+1)×(2M+1) square window $\Omega$ centered in currently predicted point on a boundary of predicted block needs to accesses positions outside of the block. In the JEM, values of $I^{(k)}$, $\partial I^{(k)}/\partial x$, $\partial I^{(k)}/\partial y$ outside of the block are set to be equal to the nearest available value inside the block. For example, this can be implemented as a padding area 901, as shown in FIG. 9B.

With BIO, it is possible that the motion field can be refined for each sample. To reduce the computational complexity, a block-based design of BIO is used in the JEM. The motion refinement can be calculated based on a 4×4 block.

In the block-based BIO, the values of $s_n$ in Eq. (9) of all samples in a 4×4 block can be aggregated, and then the aggregated values of $s_n$ in are used to derived BIO motion vectors offset for the 4×4 block. More specifically, the following formula can used for block-based BIO derivation:

$$s_{1,b_k} = \sum_{(x,y)\in b_k} \sum_{[i',j]\in\Omega} (\tau_1 \partial I^{(1)}/\partial x + \tau_0 \partial I^{(0)}/\partial x)^2;$$ Eq. (12)

$$s_{3,b_k} = \sum_{(x,y)\in b_k} \sum_{[i',j]\in\Omega} (I^{(1)} - I^{(0)})(\tau_1 \partial I^{(1)}/\partial x + \tau_0 \partial I^{(0)}/\partial x);$$

$$s_{2,b_k} = \sum_{(x,y)\in b_k} \sum_{[i',j]\in\Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y);$$

$$s_{5,b_k} = \sum_{(x,y)\in b_k} \sum_{[i',j]\in\Omega} (\tau_1 \partial I^{(1)}/\partial y + \tau_0 \partial I^{(0)}/\partial y)^2;$$

$$s_{6,b_k} = \sum_{(x,y)\in b_k} \sum_{[i',j]\in\Omega} (I^{(1)} - I^{(0)})(\tau_1 \partial I^{(1)}/\partial y + \tau_0 \partial I^{(0)}/\partial y)$$

Here, $b_k$ denotes the set of samples belonging to the k-th 4×4 block of the predicted block. $s_n$ in Eq (7) and Eq (8) are replaced by $((s_{n,bk})>>4)$ to derive the associated motion vector offsets.

In some scenarios, MV regiment of BIO may be unreliable due to noise or irregular motion. Therefore, in BIO, the magnitude of MV regiment is clipped to a threshold value. The threshold value is determined based on whether the reference pictures of the current picture are all from one direction. For example, if all the reference pictures of the current picture are from one direction, the value of the threshold is set to $12\times2^{14-d}$; otherwise, it is set to $12\times2^{13-d}$.

Gradients for BIO can be calculated at the same time with motion compensation interpolation using operations consistent with HEVC motion compensation process (e.g., 2D separable Finite Impulse Response (FIR)). In some embodiments, the input for the 2D separable FIR is the same reference frame sample as for motion compensation process and fractional position (fracX, fracY) according to the fractional part of block motion vector. For horizontal gradient $\partial I/\partial x$, a signal is first interpolated vertically using BIOfilterS corresponding to the fractional position fracY with de-scaling shift d−8. Gradient filter BIOfilterG is then applied in horizontal direction corresponding to the fractional position fracX with de-scaling shift by 18−d. For vertical gradient $\partial I/\partial y$, a gradient filter is applied vertically using BIOfilterG corresponding to the fractional position fracY with de-scaling shift d−8. The signal displacement is then performed using BIOfilterS in horizontal direction corresponding to the fractional position fracX with de-scaling shift by 18−d. The length of interpolation filter for gradients calculation BIOfilterG and signal displacement BIOfilterF can be shorter (e.g., 6-tap) in order to maintain reasonable complexity. Table 2 shows example filters that can be used for gradients calculation of different fractional positions of block motion vector in BIO. Table 3 shows example interpolation filters that can be used for prediction signal generation in BIO.

TABLE 2

Example filters for gradient calculation in BIO

| Fractional pel position | Interpolation filter for gradient(BIOfilterG) |
|---|---|
| 0 | { 8, −39, −3, 46, −17, 5} |
| 1/16 | { 8, −32, −13, 50, −18, 5} |
| 1/8 | { 7, −27, −20, 54, −19, 5} |

TABLE 2-continued

Example filters for gradient calculation in BIO

| Fractional pel position | Interpolation filter for gradient(BIOfilterG) |
|---|---|
| 3/16 | { 6, −21, −29, 57, −18, 5} |
| 1/4 | { 4, −17, −36, 60, −15, 4} |
| 5/16 | { 3, −9, −44, 61, −15, 4} |
| 3/8 | { 1, −4, −48, 61, −13, 3} |
| 7/16 | { 0, 1, −54, 60, −9, 2} |
| 1/2 | { −1, 4, −57, 57, −4, 1} |

TABLE 3

Example interpolation filters for prediction signal generation in BIO

| Fractional pel position | Interpolation filter for prediction signal(BIOfilterS) |
|---|---|
| 0 | { 0, 0, 64, 0, 0, 0 } |
| 1/16 | { 1, −3, 64, 4, −2, 0 } |
| 1/8 | { 1, −6, 62, 9, −3, 1 } |
| 3/16 | { 2, −8, 60, 14, −5, 1 } |
| 1/4 | { 2, −9, 57, 19, −7, 2 } |
| 5/16 | { 3, −10, 53, 24, −8, 2 } |
| 3/8 | { 3, −11, 50, 29, −9, 2 } |
| 7/16 | { 3, −11, 44, 35, −10, 3 } |
| 1/2 | { 3, −10, 35, 44, −11, 3 } |

In the JEM, BIG can be applied to all bi-predicted blocks when the two predictions are from different reference pictures. When Local Illumination Compensation (LIC) is enabled for a CU, BIG can be disabled.

In some embodiments, OBMC is applied for a block after normal MC process. To reduce the computational complexity, BIG may not be applied during the OBMC process. This means that BIG is applied in the MC process for a block when using its own MV and is not applied in the MC process when the MV of a neighboring block is used during the OBMC process.

4. Exemplary Methods for IBC in Video Coding

FIG. 10 shows a flowchart of an exemplary method for video encoding using intra-block copy. The method 1600 includes, at step 1610, determining whether a current block of the current picture is to be encoded using a motion compensation algorithm. The method 1600 includes, in step 1620, encoding, based on the determining, the current block by selectively applying an intra-block copy to the current block. More generally, whether or not to apply the intra-block copy to the current block is based on whether the current block is to be encoded using a specific motion compensation algorithm.

FIG. 11 shows a flowchart of another exemplary method video encoding using intra-block copy. The method 1700 includes, at step 1710, determining whether a current block of the current picture is to be encoded using an intra-block copy. The method 1700 includes, in step 1720, encoding, based on the determining, the current block by selectively applying a motion compensation algorithm to the current block. More generally, whether or not to encode the current block using the motion compensation algorithm is based on whether the current block is to be encoded using the intra-block copy.

FIG. 12 shows a flowchart of an exemplary method for video decoding using intra-block copy. The method 1800 includes, at step 1810, determining whether a current block of the current picture is to be decoded using a motion compensation algorithm. The method 1800 includes, in step 1820, decoding, based on the determining, the current block by selectively applying an intra-block copy to the current block. More generally, whether or not to apply the intra-block copy to the current block is based on whether the current block is to be decoded using a specific motion compensation algorithm.

FIG. 13 shows a flowchart of another exemplary method video decoding using intra-block copy. The method 1900 includes, at step 1910, determining whether a current block of the current picture is to be decoded using an intra-block copy. The method 1900 includes, in step 1920, decoding, based on the determining, the current block by selectively applying a motion compensation algorithm to the current block. More generally, whether or not to decode the current block using the motion compensation algorithm is based on whether the current block is to be decoded using the intra-block copy.

The methods 1600, 1700, 1800 and 1900, described in the context of FIGS. 10-13, may further include are further the step of determining whether the motion compensation algorithm is compatible with the intra-block copy. The compatibility of the intra-block copy and the motion compensation algorithms are elucidated in the following examples described for different specific motion compensation algorithms.

Example 1. After determining that the current picture must be stored in the buffer for a duration corresponding to the duration of a long-term reference picture, the current picture is not marked as a "long-term" reference picture in a buffer (e.g., a decoded picture buffer). Instead, it is marked as a new type of reference picture different from "short-term" or "long-term". For example, it may be marked as a "current" reference picture, a "self" reference picture, an "instant" reference picture, an "intra block copy" reference picture, and so on.
  (a) Similarly, prediction (e.g., motion information prediction) between pictures with the new picture type and short-term pictures, and/or prediction (e.g., motion information prediction) between pictures with the new picture type and long-term pictures are disallowed.
  (b) When the prediction between pictures with the new picture type and short/long-term pictures is allowed, scaling process of motion vectors may be skipped.

Example 2. It is proposed that affine prediction cannot be applied for IBC coded blocks. In this case, when a block is coded with IBC mode, the signaling of indications of affine prediction is skipped.
  (a) In an example, if at least one reference picture of the current block in a reference picture list is the current picture, the flag indicating whether affine prediction is used (a. k. a. affine_flag) is not signaled and inferred to be 0.
  (b) Alternatively, if the two reference pictures for the two reference lists are both the current picture, affine_flag is not signaled and inferred to be 0.
  (c) Alternatively, if a block is associated with M sets of motion information (M>2), and all the associated reference pictures are the current picture, affine_flag is not signaled and inferred to be 0.
  (d) Alternatively, if reference pictures of the current block includes both the current picture and other reference pictures, affine_flag may be signaled. In this case, affine_flag only controls whether the affine prediction is used for the non-IBC inter-prediction, i.e., inter-prediction which is not from the current picture. Some examples of this case are as following:
    (i) In an example, the current block is associated with two reference pictures, and only one reference picture is the current picture.
    (ii) In an example, the current block is associated with more than two reference pictures from, and at least one of the reference pictures is the current picture and at least one of the reference pictures is not the current picture.
    (iii) Even if affine_flag is equal to 1, affine prediction is not used for the IBC prediction with the reference picture identical to the current picture.
    (iv) Alternatively, furthermore, even if affine_flag is equal to 1, affine prediction is not used for the reference list wherein the IBC prediction is enabled with the reference picture identical to the current picture.
  (e) In an example, whether and how to apply affine prediction for IBC coded blocks can be transmitted from the encoder to the decoder at sequence level, picture level, slice level, Coding Tree Unit (CTU) a. k. a. Largest Coding Unit (LCU) level, region level, CU level, or PU level. The information can be signaled in Sequence Parameter Set (SPS), Picture Parameter Set (PPS), Slice Header (SH), CTU (a. k. a. LCU), region, CU or PU.

Example 3. It is proposed that IBC cannot be applied for a block with affine prediction. In this case, when a block is coded with affine mode, the signaling of indications of IBC is skipped.
  (a) In an example, if affine_flag is 1 for a block, any reference picture of the current block cannot be the current picture. In another example, if affine_flag is 1 for a block, at least one reference picture of the current block is not identical to the current picture.
  (b) Alternatively, whether and how to apply IBC for a block with affine prediction can be transmitted from the encoder to the decoder at sequence level, picture level, slice level, Coding Tree Unit (CTU) (e.g., Largest Coding Unit (LCU) level, region level, CU level, or PU level). The information can be signaled in Sequence Parameter Set (SPS), Picture Parameter Set (PPS), Slice Header (SH), CTU (a. k. a. LCU), region, CU or PU.

Example 4. Alternatively, it is proposed that affine prediction can be applied for IBC coded blocks. In this case, the indications of affine and IBC may be both signaled. When affine prediction is applied for a IBC coded block, the following may further apply:
  (a) In an example, the MV Prediction (MVP) for control points (such as $\vec{v}_0$ and $\vec{v}_1$) can only be derived from previously decoded MVs with the current picture as the reference picture. MV scaling is disabled for MVP derivation. Vice versa, MVP for control points of a block with an affine prediction but not IBC-coded, can only be derived from previously decoded MVs with reference pictures not identical to the current picture.
  (b) In an example, MVs at control points explained in "Examples of affine prediction" section are signaled in the integer precision. MVPs for them should be truncated or rounded to the integer-pixel precision.
  (c) In an example, if MVs at control points (such as $\vec{v}_0$ and $\vec{v}_1$) are derived from neighboring MVs, such as in the affine-merge mode, the derived MVs are truncated or rounded to the integer-pixel precision.

(d) In an example, a MV inside the block derived from MVs at the control points, such as $(v_x, v_y)$ in eq. (1) are truncated or rounded to the integer-pixel precision.

(e) In an example, OBMC is not applied.

(f) In an example, the y component of the MV at control points (e.g., $\vec{v}_1$) is not signaled and is always considered as zero.

Example 5. It is proposed that the temporal vector used in the first step of ATMVP cannot be derived from a neighboring block coded with IBC. In one example, a neighboring block with the current picture as its reference picture is marked as "unavailable" or intra-coded in the first step of ATMVP.

Example 6. It is proposed that a sub-CU's corresponding block is marked as "unavailable" or intra-coded if the corresponding block is coded with IBC in the second step of ATMVP.

Example 7. Alternatively, it is proposed that the motion information of a sub-CU's corresponding block is copied to the Sub-CU without any scaling if corresponding block is coded with IBC in the second step of ATMVP. The Sub-CU applies IBC with the same MV as the corresponding block but the reference picture is changed to the current picture.

Example 8. More than one ATMVP candidates may be added wherein one may be derived from temporal neighboring blocks using above methods and the other one is derived from temporal neighboring blocks with at least one sub-CU with different way of deriving sub-CU motion information if the co-located sub-CU is coded with IBC.

Example 9. It is proposed a neighbouring block is marked as "unavailable" or intra-coded if the corresponding block is coded with IBC in STMVP.

Example 10. Alternatively, it is proposed the motion information of a neighbouring block is copied to the Sub-CU without any scaling if the neighbouring block is coded with IBC in STMVP. The Sub-CU applies IBC with the same MV as the neighbouring block.

(a) In an example, there is no need to access the temporal motion information from a co-located temporal neighboring block in this case.

(b) When there is more than one neighboring block of a sub-CU coded with IBC, those associated motion vectors may be jointly used to derive the motion information of the current sub-CU.

Example 11. It is proposed that the averaged (or other kinds of derivation function, like weighted average) motion vector can only be derived from MVs all referring to the current picture or all referring to a reference picture not identical to the current picture.

Example 12. More than one STMVP candidates may be added wherein one may be derived from neighboring blocks with non-current pictures of all sub-CUs and one may be derived from neighboring blocks with current-pictures of all sub-CUs.

Example 13. It is proposed that BIO cannot be applied for IBC coded blocks. In one example, if at least one reference picture of the current block is the current picture, BIO is not conducted in the current block. Listed below are some examples of the technology described in this application. A block, as used in this application, can be a contiguous or a noncontiguous collection of pixels, voxels, sub-pixels, and/or sub-voxels. For example, a block can be rectilinear, such as a 4×4 square, 6×4 rectangle, or curvilinear, such as an ellipse.

A portion of the visual information, as used in this application, can be a subset of visual information. A coded representation, as used in this application, can be a bitstream representing the visual information that has been encoded using one of the techniques described in this application. An indicator, as used in this application, can be a flag or a field in the coded representation or can be multiple separate flags or fields.

A decoding technique, as used in this application can be applied by a decoder and can be implemented in hardware or software. The decoding technique can undo in reverse sequence everything a coder does. When an appropriate decoding technique is applied to an encoded representation, a visual information can be obtained as a result.

An initial block in the plurality of blocks, as used in this application, is a block occurring before the first block in the coded representation.

Property can include a luma of the sample, an x-direction and/or a y-direction gradient of the luma, a distance between the second sample and the third and fourth corresponding samples. The difference the values to minimize can be expressed by equation (5).

The obtained values can include luma values, values of luma gradients in the X-direction and/or values of luma gradients in the Y-direction.

Listing of examples:

1. A visual information decoding method (e.g., method 1000 depicted in FIG. 16), comprising: determining (1002) that a first encoded block being decoded representing a portion of the visual information is coded using a first coding technique; and decoding (1004) the coded representation by using a first decoding technique corresponding to the first coding technique and by excluding use of a second decoding technique corresponding to the second coding technique; wherein one of the two decoding techniques corresponds to a coding technique that uses a same video picture for coding the block being decoded as a reference picture, and the other of the two decoding techniques corresponds to Bi-directional Optical Flow (BIO) technique that refines the prediction samples using optical flow information with the visual information for coding the block being decoded.

2. The method of example 1, wherein the coding technique that uses a same video picture for coding the block being decoded as a reference picture comprises intra-block copy (IBC) that uses a second block of a same video picture for coding the block being decoded.

3. The method of examples 1-2, further comprising: deciding, based on the determining, that a coded representation of the block being decoded excludes an indicator of use of a second coding technique; and parsing the coded representation based on the deciding.

4. The method of examples 1-2, comprising decoding a first encoded block using the IBC decoding technique by: obtaining a first plurality of encoded blocks representing a first picture; decoding an initial block in the first plurality of encoded blocks; and upon decoding the initial block, decoding the first encoded block in the first plurality of encoded blocks based on the initial block.

5. The method of examples 1-2, comprising decoding a block using the BIO decoding technique by: obtaining a second plurality of blocks including a block being decoded, and a second plurality of blocks representing a second picture; obtaining a third plurality of corresponding samples associated with a third picture and a fourth plurality of corresponding samples associated with a fourth picture; deriving a plurality of intensity offsets of samples within the block being decoded based on gradients of the third plurality of corresponding samples and gradients of the fourth plurality of corresponding samples; and obtaining a plurality of samples representing the block being decoded based on the plurality of intensity offsets.

6. A method for encoding a visual information (e.g., method 1100 depicted in FIG. 17), comprising: obtaining (1102) a first block to encode representing a portion of the visual information; and encoding (1104) the first block to encode by using a first encoding technique and by excluding use of a second encoding technique; wherein one of two encoding technique uses a same video picture for coding the block to encode as a reference picture and the other encoding technique corresponds to Bi-directional Optical Flow (BIO) technique that refines the prediction samples using optical flow information with the visual information for encoding the block to encode.

7. The method of example 6, wherein the encoding technique that uses a same video picture for coding the block being decoded as a reference picture comprises intra-block copy (IBC) that uses a second block of a same video picture for coding the block to encode.

8. The method of examples 6-7, further comprising: excluding to encode an indicator of use of the second encoding technique.

9. The method of example 6, comprising encoding the first block using the IBC technique by: dividing a first picture into a first plurality of blocks; encoding an initial block in the first plurality of blocks; and upon encoding the initial block, encoding a first block in the first plurality of blocks based on the initial block.

10. The method of examples 6-9, comprising encoding a block using the BIO technique in a second picture by: dividing a second picture into a second plurality of blocks including the block to encode; dividing a third picture into a third plurality of corresponding samples and fourth picture into a fourth plurality of corresponding samples; deriving a plurality of intensity offsets of samples within the block to encode based on gradients of the third plurality of corresponding samples and gradients of the fourth plurality of corresponding samples, encoding a plurality of samples representing the block to encode based on the plurality of intensity offsets.

11. The method of examples 5-10, wherein the third picture and the fourth picture are different from the second picture.

12. The method of examples 5-11, wherein the visual information comprises an ordered sequence of pictures and wherein the third picture and the fourth picture are both ahead of the second picture, are both behind the second picture, or the third picture is behind the second picture and the fourth picture is ahead of the second picture.

13. The method of examples 6-12, comprising avoiding using the BIO technique to encode the first picture when the first picture is encoded using the IBC technique.

14. The method of examples 5-13, comprising: in case that the third picture is the same as the second picture, or the fourth picture is the same as the second picture, avoiding applying the BIO technique.

15. A video coding apparatus comprising a processor configured to implement one or more of the above described methods.

16. A video decoding apparatus comprising a processor configured to implement one or more of the above described methods.

17. A computer readable medium having processor-executable code stored thereon, the code, when executed, causing a processor to implement one or more of the methods recited in the above examples.

5. Example Implementation Platforms for the Disclosed Technology 14 is a block diagram illustrating an example of the architecture for a computer system or other control device 2000 that can be utilized to implement various portions of the presently disclosed technology, including (but not limited to) methods 1600, 1700, 1800 and 1900. In FIG. 14, the computer system 2000 includes one or more processors 2005 and memory 2010 connected via an interconnect 2025. The interconnect 2025 may represent any one or more separate physical buses, point to point connections, or both, connected by appropriate bridges, adapters, or controllers. The interconnect 2025, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire." For example, the processor 2005 may be configured to perform visual information encoding, transcoding or decoding operation using one of the methods described in the present document.

The processor(s) 2005 may include central processing units (CPUs) to control the overall operation of, for example, the host computer. In certain embodiments, the processor(s) 2005 accomplish this by executing software or firmware stored in memory 2010. The processor(s) 2005 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 2010 can be or include the main memory of the computer system. The memory 2010 represents any suitable form of random access memory (RAM), read-only memory (ROM), flash memory, or the like, or a combination of such devices. In use, the memory 2010 may contain, among other things, a set of machine instructions which, when executed by processor 2005, causes the processor 2005 to perform operations to implement embodiments of the presently disclosed technology.

Also connected to the processor(s) 2005 through the interconnect 2025 is a (optional) network adapter 2015. The network adapter 2015 provides the computer system 2000 with the ability to communicate with remote devices, such as the storage clients, and/or other storage servers, and may be, for example, an Ethernet adapter or Fiber Channel adapter.

FIG. 15 shows a block diagram of an example embodiment of a mobile device 2100 that can be utilized to implement various portions of the presently disclosed technology, including (but not limited to) methods 1600, 1700, 1800 and 1900. The mobile device 2100 can be a laptop, a smartphone, a tablet, a camcorder, or other types of devices that are capable of processing videos. The mobile device 2100 includes a processor or controller 2101 to process data, and memory 2102 in communication with the processor 2101 to store and/or buffer data. For example, the processor 2101 can include a central processing unit (CPU) or a microcontroller unit (MCU). In some implementations, the processor 2101 can include a field-programmable gate-array (FPGA). In some implementations, the mobile device 2100 includes or is in communication with a graphics processing unit (GPU), video processing unit (VPU) and/or wireless communications unit for various visual and/or communications data processing functions of the smartphone device. For example, the memory 2102 can include and store processor-executable code, which when executed by the processor 2101, configures the mobile device 2100 to perform various operations, e.g., such as receiving information, commands, and/or data, processing information and data, and transmitting or providing processed information/data to another device, such as an actuator or external display.

To support various functions of the mobile device 2100, the memory 2102 can store information and data, such as instructions, software, values, images, and other data processed or referenced by the processor 2101. For example, various types of Random Access Memory (RAM) devices, Read Only Memory (ROM) devices, Flash Memory devices, and other suitable storage media can be used to implement storage functions of the memory 2102. In some implementations, the mobile device 2100 includes an input/output (I/O) unit 2103 to interface the processor 2101 and/or memory 2102 to other modules, units or devices. For example, the I/O unit 2103 can interface the processor 2101 and memory 2102 with to utilize various types of wireless interfaces compatible with typical data communication standards, e.g., such as between the one or more computers in the cloud and the user device. In some implementations, the mobile device 2100 can interface with other devices using a wired connection via the I/O unit 2103. The mobile device 2100 can also interface with other external interfaces, such as data storage, and/or visual or audio display devices 2104, to retrieve and transfer data and information that can be processed by the processor, stored in the memory, or exhibited on an output unit of a display device 2104 or an external device. For example, the display device 2104 can display a video frame that includes a block (a CU, PU or TU) that applies the intra-block copy based on whether the block is encoded using a motion compensation algorithm, and in accordance with the disclosed technology.

In some embodiments, a video decoder apparatus may implement a method of video decoding in which the intra-block copy as described herein is used for video decoding. The method may be similar to the above-described methods 1600, 1700, 1800 and 1900.

In some embodiments, a decoder-side method of video decoding may use the intra-block copy for improving video quality by determining whether a current block of the current picture is to be decoded using a motion compensation algorithm, and decoding, based on the determining, the current block by selectively applying an intra-block copy to the current block.

In other embodiments, a decoder-side method of video decoding may use the intra-block copy for improving video quality by determining whether a current block of the current picture is to be decoded using an intra-block copy, and decoding, based on the determining, the current block by selectively applying a motion compensation algorithm to the current block.

In some embodiments, the video decoding methods may be implemented using a decoding apparatus that is implemented on a hardware platform as described with respect to FIG. 14 and FIG. 15.

Below are improvements measured by incorporating IBC into VTM-1.0, which is a reference software for the video coding standard named Versatile Video Coding (VVC). VTM stands for VVC Test Model.

|  | Over VTM-1.0 | | | | |
| --- | --- | --- | --- | --- | --- |
|  | Y | U | V | EncT | DecT |
| Class A1 | −0.33% | −0.50% | −0.49% | 162% | 100% |
| Class A2 | −0.96% | −1.17% | −0.77% | 159% | 98% |
| Class B | −0.94% | −1.14% | −1.34% | 162% | 102% |
| Class C | −1.03% | −1.58% | −1.92% | 160% | 101% |
| Class E | −1.48% | −1.46% | −1.80% | 160% | 104% |
| Overall | −0.95% | −1.19% | −1.31% | 161% | 101% |
| Class D | −0.57% | −0.73% | −0.91% | 161% | 100% |
| Class F (optional) | −20.25% | −20.15% | −20.93% | 194% | 95% |
| Class SCC 1080p | −52.94% | −53.26% | −53.37% | 217% | 74% |

In the above table, "Y", "U", "V" represent colors in the YUV color encoding system which encodes a color image or video taking human perception into account. The EncT and DecT represent a ratio of the encoding and decoding time using the IBC compared to the encoding and decoding time without the IBC, respectively. Specifically, EncT=TestEncodingTime/anchorEncodingTime DecT=TestEncodingTime/anchorEncodingTime.

The various classes, such as Class A1, Class A2, etc., represent a grouping of standard video sequences used in testing performance of various video coding techniques. The negative percentages under the "Y", "U", "V" columns represent bit-rate savings when IBC is added to VTM-1.0. The percentages under the EncT and DecT columns that are over 100% show how much the encoding/decoding with IBC is slower than encoding/decoding without IBC. For example, a percentage of 150% means that the encoding/decoding with IBC is 50% slower than the encoding/decoding without the IBC. The percentage below 100% shows how much the encoding/decoding with IBC is faster than encoding/decoding without the IBC. Two classes, class F and class SCC, highlighted in green in the table above, show that bit-rate savings exceed 3%.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
    determining, for a conversion between a current video block of a video region of a current picture of a video and a bitstream of the video, whether an affine prediction mode is applied to the current video block, wherein when an intra block copy (IBC) mode is applied to the current video block, the affine prediction mode is disabled for the current video block;
    determining, whether Bi-directional Optical Flow (BDOF) technique is applied to the current video block at least based on $\tau_0$ and $\tau_1$, wherein $\tau_0$ is a difference between a picture order count of the current picture (current) and a picture order count (POC) of a first reference picture $R_0$ ($\tau_0$=POC(current)−POC($R_0$)), $\tau_1$ is a difference between a picture order count of a second reference picture $R_1$ and the picture order count of the current picture ($\tau_1$=POC($R_1$)−POC(current)), wherein when a product of $\tau_0$ and $\tau_1$ is less than zero, the BDOF is disabled for the current video block, and when the IBC mode is applied to the current video block, the BDOF is disabled for the current video block; and
    performing the conversion according to the determinings, wherein when the IBC mode is applied to the current video block and when a spatial neighboring video block of the current video block is coded with a spatial-temporal motion vector prediction (STMVP) mode, motion information of the current video block is unavailable for deriving a corresponding video region in a collocated picture of the spatial neighboring block.

2. The method of claim 1, wherein the BDOF technique comprises:
    dividing the current video block into at least one subblock based on a size of the current video block, wherein a width and a length of the at least one subblock are both greater than or equal to 1;
    obtaining a first plurality of prediction samples associated with the first reference picture and a second plurality of prediction samples associated with the second reference picture for each of the at least one subblock;
    deriving at least one gradient based on the first plurality of prediction samples and the second plurality of prediction samples;
    generating at least one motion vector offset based on the at least one gradient; and generating at least one refined prediction sample for each of the at least one subblock at least based on the at least one motion vector offset.

3. The method of claim 1, wherein the first reference picture is different from the current picture, and the second reference picture is different from the current picture.

4. The method of claim 1, wherein the first reference picture is behind the current picture in displaying order, and the second reference picture is ahead of the current picture in displaying order.

5. The method of claim 1, further comprising:
determining an indicator of use of the IBC technique is excluded in the bitstream in response to the BDOF technique being applied for the current video block.

6. The method of claim 1, wherein the conversion includes encoding the video block into the bitstream.

7. The method of claim 1, wherein the conversion includes decoding the current video block from the bitstream.

8. An apparatus for processing video data comprising a processor and a non-transitory memory with instructions thereon, wherein the instructions upon execution by the processor, cause the processor to:
determine, for a conversion between a current video block of a video region of a current picture of a video and a bitstream of the video, whether an affine prediction mode is applied to the current video block, wherein when an intra block copy (IBC) mode is applied to the current video block, the affine prediction mode is disabled for the current video block;
determine, whether Bi-directional Optical Flow (BDOF) technique is applied to the current video block at least based on $\tau_0$ and $\tau_1$, wherein $\tau_0$ is a difference between a picture order count of the current picture (current) and a picture order count (POC) of a first reference picture $R_0$ ($\tau_0$=POC(current)−POC($R_0$)), $\tau_1$ is a difference between a picture order count of a second reference picture $R_1$ and the picture order count of the current picture ($\tau_1$=POC($R_1$)−POC(current)), wherein when a product of $\tau_0$ and $\tau_1$ is less than zero, the BDOF is disabled for the current video block, and when the IBC mode is applied to the current video block, the BDOF is disabled for the current video block; and
perform the conversion according to the determinations, wherein when the IBC mode is applied to the current video block and when a spatial neighboring video block of the current video block is coded with a spatial-temporal motion vector prediction (STMVP) mode, motion information of the current video block is unavailable for deriving a corresponding video region in a collocated picture of the spatial neighboring block.

9. The apparatus of claim 8, wherein the BDOF technique comprises:
dividing the current video block into at least one subblock based on a size of the current video block, wherein a width and a length of the at least one subblock are both greater than or equal to 1;
obtaining a first plurality of prediction samples associated with the first reference picture and a second plurality of prediction samples associated with the second reference picture for each of the at least one subblock;
deriving at least one gradient based on the first plurality of prediction samples and the second plurality of prediction samples;
generating at least one motion vector offset based on the at least one gradient; and
generating at least one refined prediction sample for each of the at least one subblock at least based on the at least one motion vector offset.

10. The apparatus of claim 8, wherein the first reference picture is different from the current picture, and the second reference picture is different from the current picture.

11. The apparatus of claim 8, wherein the first reference picture is behind the current picture in displaying order, and the second reference picture is ahead of the current picture in displaying order.

12. The apparatus of claim 8, wherein the instructions upon execution by the processor, cause the processor to:
determine an indicator of use of the IBC technique is excluded in the bitstream in response to the BDOF technique being applied for the current video block.

13. The apparatus of claim 8, wherein the conversion includes encoding the current video block into the bitstream.

14. The apparatus of claim 8, wherein the conversion includes decoding the current video block from the bitstream.

15. A non-transitory computer-readable storage medium storing instructions that cause a processor to:
determine, for a conversion between a current video block of a video region of a current picture of a video and a bitstream of the video, whether an affine prediction mode is applied to the current video block, wherein when an intra block copy (IBC) mode is applied to the current video block, the affine prediction mode is disabled for the current video block;
determine, whether Bi-directional Optical Flow (BDOF) technique is applied to the current video block at least based on $\tau_0$ and $\tau_1$, wherein $\tau_0$ is a difference between a picture order count of the current picture (current) and a picture order count (POC) of a first reference picture $R_0$ ($\tau_0$=POC(current)−POC($R_0$)), $\tau_1$ is a difference between a picture order count of a second reference picture $R_1$ and the picture order count of the current picture ($\tau_1$=POC($R_1$)−POC(current)), wherein when a product of $\tau_0$ and $\tau_1$ is less than zero, the BDOF is disabled for the current video block, and when the IBC mode is applied to the current video block, the BDOF is disabled for the current video block; and
perform the conversion according to the determinations, wherein when the IBC mode is applied to the current video block and when a spatial neighboring video block of the current video block is coded with a spatial-temporal motion vector prediction (STMVP) mode, motion information of the current video block is unavailable for deriving a corresponding video region in a collocated picture of the spatial neighboring block.

16. The non-transitory computer-readable storage medium of claim 15, wherein the BDOF technique comprises:
dividing the current video block into at least one subblock based on a size of the current video block, wherein a width and a length of the at least one subblock are both greater than or equal to 1;
obtaining a first plurality of prediction samples associated with the first reference picture and a second plurality of prediction samples associated with the second reference picture for each of the at least one subblock;
deriving at least one gradient based on the first plurality of prediction samples and the second plurality of prediction samples;
generating at least one motion vector offset based on the at least one gradient; and generating at least one refined prediction sample for each of the at least one subblock at least based on the at least one motion vector offset.

17. The non-transitory computer-readable storage medium of claim 15, wherein the first reference picture is different from the current picture, and the second reference picture is different from the current picture.

18. The non-transitory computer-readable storage medium of claim 15, wherein the first reference picture is behind the current picture in displaying order, and the second reference picture is ahead of the current picture in displaying order.

19. The non-transitory computer-readable storage medium of claim 15, wherein the instructions further cause the processor to:
determine an indicator of use of the IBC technique is excluded in the bitstream in response to the BDOF technique being applied for the current video block.

20. A non-transitory computer-readable recording medium storing a bitstream which is generated by a method performed by a video processing apparatus, wherein the method comprises:
determining, for a current video block of a video region of a current picture of a video, whether an affine prediction mode is applied to the current video block, wherein when an intra block copy (IBC) mode is applied to the current video block, the affine prediction mode is disabled for the current video block;
determining, whether Bi-directional Optical Flow (BDOF) technique is applied to the current video block at least based on $\tau_0$ and $\tau_1$, wherein $\tau_0$ is a difference between a picture order count of the current picture (current) and a picture order count (POC) of a first reference picture $R_0$ ($\tau_0$=POC(current)−POC($R_0$)), $\tau_1$ is a difference between a picture order count of a second reference picture $R_1$ and the picture order count of the current picture ($\tau_1$=POC($R_1$)−POC(current)), wherein when a product of $\tau_0$ and $\tau_1$ is less than zero, the BDOF is disabled for the current video block, and when the IBC mode is applied to the current video block, the BDOF is disabled for the current video block; and
generating the bitstream from the current video block according to the determinings,
wherein when the IBC mode is applied to the current video block and when a spatial neighboring video block of the current video block is coded with a spatial-temporal motion vector prediction (STMVP) mode, motion information of the current video block is unavailable for deriving a corresponding video region in a collocated picture of the spatial neighboring block.

* * * * *